US007753790B2

(12) United States Patent
Nguyen et al.

(10) Patent No.: US 7,753,790 B2
(45) Date of Patent: Jul. 13, 2010

(54) APPARATUS AND METHOD FOR GAMING TOURNAMENT NETWORK

(75) Inventors: Binh T. Nguyen, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 1336 days.

(21) Appl. No.: 11/143,345

(22) Filed: Jun. 2, 2005

(65) Prior Publication Data

US 2005/0221882 A1 Oct. 6, 2005

Related U.S. Application Data

(63) Continuation of application No. 10/112,967, filed on Mar. 29, 2002, now Pat. No. 6,908,390.

(51) Int. Cl.
*A63F 13/00* (2006.01)

(52) U.S. Cl. ........................ 463/42; 463/16; 273/143 R

(58) Field of Classification Search ............. 463/12–13, 463/16–22, 25, 30–31, 39–43; 273/143 R, 273/461; 709/231; 382/100; 235/380, 379; 725/25, 22, 141; 345/2.1
See application file for complete search history.

(56) References Cited

U.S. PATENT DOCUMENTS

| | | | | |
|---|---|---|---|---|
| 4,339,798 | A | 7/1982 | Hedges et al. | |
| 4,467,424 | A | 8/1984 | Hedges et al. | |
| 4,926,327 | A * | 5/1990 | Sidley ......................... | 463/13 |
| 5,083,271 | A | 1/1992 | Thacher et al. | |
| 5,259,613 | A | 11/1993 | Marnell, II | |
| 5,544,892 | A | 8/1996 | Breeding | |
| 5,586,937 | A | 12/1996 | Menashe | |
| 5,655,961 | A | 8/1997 | Acres et al. | |

(Continued)

FOREIGN PATENT DOCUMENTS

| | | |
|---|---|---|
| CA | 2351799 | 12/2001 |

(Continued)

OTHER PUBLICATIONS

Combined Search and Examination Report from Foreign Application No. GB0616868.6, Oct. 12, 2006, 4 pages.

(Continued)

*Primary Examiner*—Peter DungBa Vo
*Assistant Examiner*—Masud Ahmed
(74) *Attorney, Agent, or Firm*—Weaver Austin Villeneuve & Sampson LLP

(57) ABSTRACT

A gaming system may include a number of gaming units and a host computer operatively coupled to the gaming units, and be configured to allow a gaming tournament to be conducted. Each of the gaming units may comprise a video display unit, a microphone, a camera, a speaker and a gaming unit controller. The gaming unit controller may be programmed to allow a person to select tournament play as a single or a group tournament player at a reserved or unreserved gaming unit, and to allow player data to be transmitted to the host computer. The host computer may include a host interface unit capable of receiving audio, visual and/or data input from a tournament host during the tournament, and a host computer controller capable of causing host data to be transmitted to the gaming units.

20 Claims, 23 Drawing Sheets

U.S. PATENT DOCUMENTS

| | | | | |
|---|---|---|---|---|
| 5,711,715 | A | 1/1998 | Ringo et al. | |
| 5,755,621 | A | 5/1998 | Marks et al. | |
| 5,762,552 | A | 6/1998 | Vuong et al. | |
| 5,779,549 | A | 7/1998 | Walker et al. | |
| 5,971,271 | A | 10/1999 | Wynn et al. | |
| 6,039,648 | A | 3/2000 | Guinn et al. | |
| 6,082,887 | A | 7/2000 | Feuer et al. | |
| 6,224,486 | B1 | 5/2001 | Walker et al. | |
| 6,280,325 | B1 | 8/2001 | Fisk | |
| 6,287,202 | B1 | 9/2001 | Pascal et al. | |
| 6,508,709 | B1 * | 1/2003 | Karmarkar | 463/42 |
| 6,672,589 | B1 * | 1/2004 | Lemke et al. | 273/236 |
| 6,712,689 | B2 | 3/2004 | Clarkson et al. | |
| 6,817,948 | B2 | 11/2004 | Pascal et al. | |
| 6,908,387 | B2 | 6/2005 | Hedrick et al. | |
| 6,908,390 | B2 | 6/2005 | Nguyen et al. | |
| 7,018,291 | B1 * | 3/2006 | Lemke et al. | 463/12 |
| 2001/0019965 | A1 | 9/2001 | Ochi | |
| 2001/0036865 | A1 | 11/2001 | Neal | |
| 2002/0034980 | A1 * | 3/2002 | Lemmons et al. | 463/40 |
| 2002/0094869 | A1 | 7/2002 | Harkham | |
| 2003/0027631 | A1 | 2/2003 | Hedrick et al. | |
| 2003/0054868 | A1 | 3/2003 | Paulsen et al. | |
| 2003/0186745 | A1 | 10/2003 | Nguyen et al. | |
| 2005/0043088 | A1 | 2/2005 | Nguyen et al. | |
| 2006/0258446 | A1 | 11/2006 | Nguyen et al. | |

FOREIGN PATENT DOCUMENTS

| | | |
|---|---|---|
| EP | 0 291 705 | 4/1988 |
| KR | 20000018155 | 4/2000 |
| KR | 20010070770 | 7/2001 |
| KR | 20010096091 | 11/2001 |
| KR | 20020036440 | 5/2002 |
| WO | WO00/29084 | 5/2000 |
| WO | WO00/64545 | 11/2000 |
| WO | WO00/71218 | 11/2000 |
| WO | WO01/54041 | 7/2001 |
| WO | WO 02/13932 | 2/2002 |
| WO | WO03/083796 | 10/2003 |
| WO | 2004/050201 | 6/2004 |
| WO | WO2007/143575 | 12/2007 |

OTHER PUBLICATIONS

Examination Report from Australian Patent Application No. 2006208418, dated Jan. 9, 2008, 2 pages.

International Search Report and Written Opinion dated Feb. 15, 2008 from International application No. PCT/US2007/070255, 10 pages.

Examination Report from Foreign Application No. GB0616868.6, Jan. 19, 2007, 2 pages.

Report of Telephone Conversation between Agent and Examiner from Foreign Application No. GB0616868.6, Jan. 24, 2007, 2 pages.

Declaration of Jeffrey Lindo dated Jul. 2000 and filed in Patent Office in connection with U.S. Patent No. 4,575,622.

Roulabette Booklet, pp. 1-42, 1979 (prior art).

International Search Report dated Dec. 11, 2002, from corresponding PCT application PCT/US02/09228 (4 pages).

First Chinese Office Action mailed Mar. 6, 2009 in Application No. 200780028095.6.

Australian Statement of Grounds and Particulars rev'd May 4, 2009 in relation to Patent Application No. 2006208418.

Second Chinese Office Action mailed Jun. 19, 2009 in Application No. 200780028095.6.

Third Chinese Office Action mailed Oct. 2, 2009 in Application No. 200780028095.6.

"PokerPro," Aristocrat Technologies Europe Ltd., 4 pages.

Examination Report dated Jan. 27, 2006 in GB Application No. GB0419052.6.

Examination Report dated Mar. 24, 2005 in GB Application No. GB0419052.6.

Examination Report dated Oct. 28, 2005 in GB Application No. GB0419052.6.

U.S. Advisory Action mailed Nov. 4, 2004 in U.S. Appl. No. 10/112,967.

U.S. Notice of Allowance mailed Jan. 26, 2005 in U.S. Appl. No. 10/112,967.

U.S. Office Action mailed Aug. 24, 2004 in U.S. Appl. No. 10/112,967.

U.S. Office Action mailed Jan. 14, 2004 in U.S. Appl. No. 10/112,967.

U.S. Examiner Interview Summary mailed May 7, 2004 in U.S. Appl. No. 10/112,967.

U.S. Interview Summary Record mailed Apr. 5, 2005 in U.S. Appl. No. 10/112,967.

Australian Examiner's First Report mailed Feb. 15, 2006 in Application No. 2002306874.

* cited by examiner

FIGURE 6A
FIGURE 6B
284
MEGA CASINO TOURNAMENT VOUCHER
TOURNAMENT DATE / TIME: 06/19/02 / 11:00 AM
CASINO TOURNAMENT LOCATION: EAST WING
TOURNAMENT NAME: BIG BUCKS
GAME TYPE: VIDEO
TRANSACTION DATE / TIME: 06/12/02 / 12:15:36
TOURNAMENT FEE PAID: $25.00
PLAYER ID: 1234
FIXED MODE: MACHINE 1568
SESSION ID: 3758
285
286
287
288
289
290
POT OF GOLD CASINO TOURNAMENT VOUCHER
TOURNAMENT DATE / TIME: 09/23/02 / 7:00 PM
CASINO TOURNAMENT LOCATION: RED ROOM
TOURNAMENT NAME: EASY MONEY
GAME TYPE: VIDEO
TRANSACTION DATE / TIME: 09/23/02 / 10:17:45
TOURNAMENT FEE PAID: $75.00
PLAYER ID: MARY SMITH
FIXED MODE: MACHINE 3564
SESSION ID: 7824
291

FIGURE 6C
FIGURE 6D
292
294
SILVER STAR CASINO TOURNAMENT VOUCHER
TOURNAMENT DATE / TIME: 04/15/02 / 11:00 PM
CASINO TOURNAMENT LOCATION: GOLD ROOM
TOURNAMENT NAME: MEGA MONEY
GAME TYPE: REEL
TRANSACTION DATE / TIME: 04/12/02 / 11:17:42
TOURNAMENT FEE PAID: $100.00
PLAYER ID: 5678
FLOAT MODE: CHOOSE ANY MACHINE
SESSION ID: 2368
293
295
TOWERING CASINO TOURNAMENT VOUCHER
TOURNAMENT DATE / TIME: 12/12/02 / 1:00 PM
CASINO TOURNAMENT LOCATION: BLUE ROOM
TOURNAMENT NAME: LOTS OF CASH
GAME TYPE: REEL
TRANSACTION DATE / TIME: 12/11/02 / 10:13:22
TOURNAMENT FEE PAID: $40.00
PLAYER ID: JOE SMITH
FLOAT MODE: CHOOSE ANY MACHINE
SESSION ID: 4751

FIG. 12
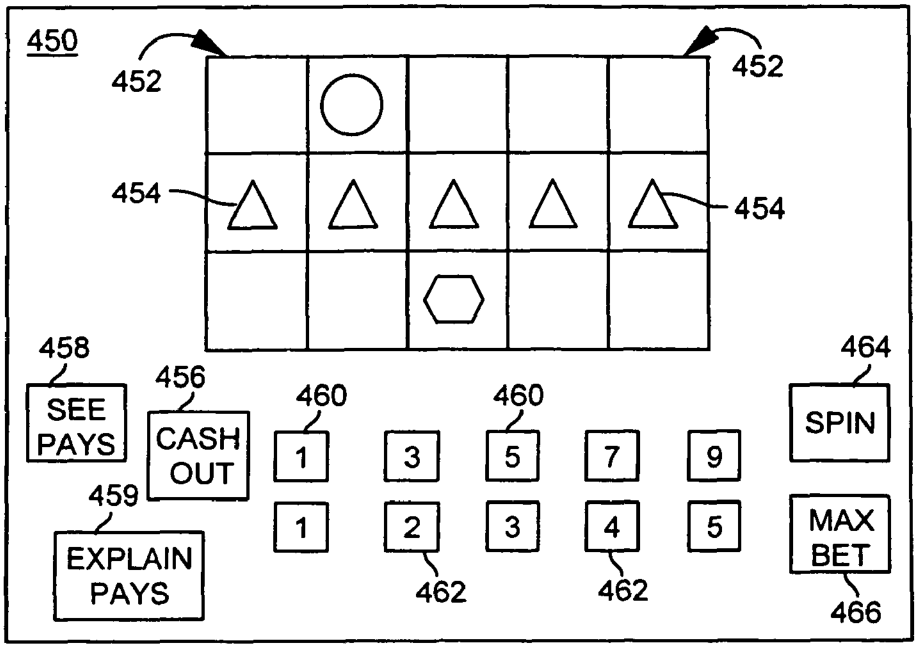
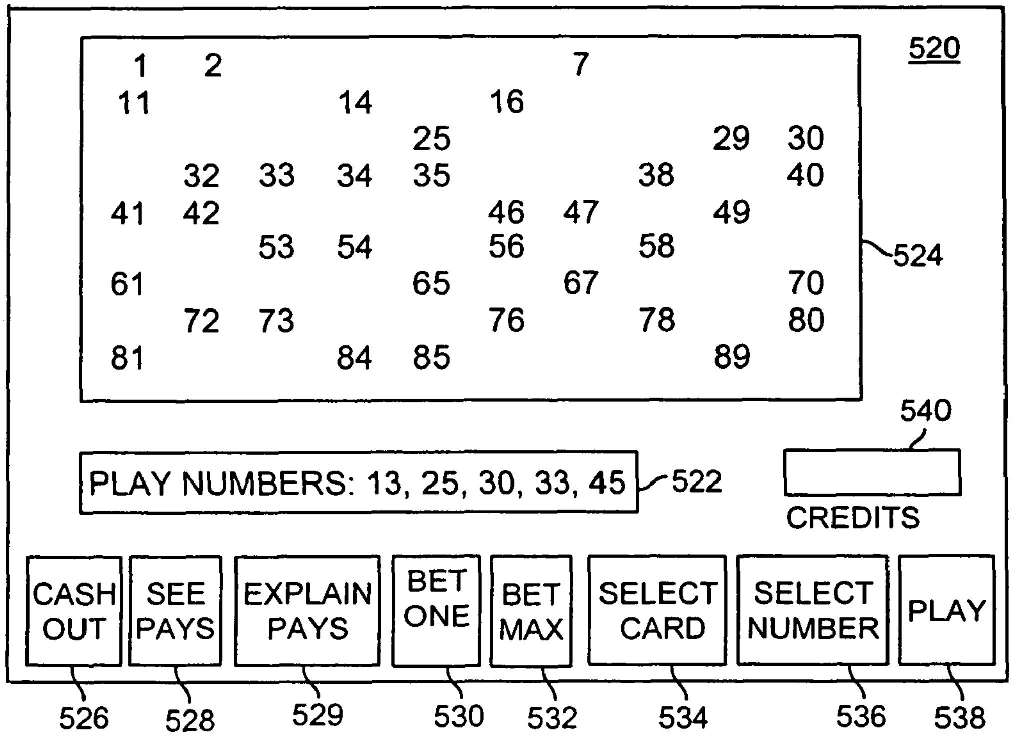
FIG. 13

APPARATUS AND METHOD FOR GAMING TOURNAMENT NETWORK

CROSS-REFERENCES TO RELATED APPLICATIONS

This application is a continuation application of U.S. Pat. No. 10/112,967, filed Mar. 29, 2002, entitled "An Apparatus and Method for a Gaming Tournament Network," which is hereby incorporated by reference herein.

BACKGROUND

This patent is directed to an apparatus and method for a gaming tournament including a tournament host capable of hosting a gaming tournament among numerous players located at the gaming units of their choosing and capable of real-time, tournament event driven interaction with the numerous players during the gaming tournament. Numerous patents have been issued directed to online tournament games. One such patent, U.S. Pat. No. 6,224,486 issued to Walker et al., describes a method and system for a distributed electronic tournament system which allows remotely located players to be identified via a player tracking system, and allows the identified players to participate in tournaments such as chess, bridge, computer golf games, poker and the like from their homes. In addition to player tracking, the database, maintained at a central location, enables registration of players, acceptance of entry fees, and coordination of prize money.

Another patent directed toward online tournament games, U.S. Pat. No. 6,039,648, issued to Guinn et al., describes an apparatus and method for an automated tournament gaming system utilizing a computer network coupled to a number of gaming machines. The 'Guinn patent also provides for a multi-site progressive automated tournament. The automation is provided by a central server computer coupled to a tournament schedule computer.

Additionally, U.S. Pat. No. 5,259,613 issued to Marnell, describes a gambling parlor configured to allow an operator to provide video programming, selected from a menu, to monitors mounted adjacent to the gaming machines of the gaming parlor. The operator is outfitted with a variety of audio and video entertainment items including a VCR, an audio tape deck, a camera trained on the operator, a microphone and commercial television broadcasting capability. A player, while gaming, may then select to be entertained by one of the audio or video entertainment items via the nearest video monitor.

Typically, each of the conventional gaming units used in a gaming tournament have been provided with a display unit that is capable of generating video images, a coin or bill acceptor, and a controller with a memory and a processor that controls the overall operation of the gaming unit. The controller was programmed to allow a person to make a wager, to cause video images to be generated on the display unit, to determine an outcome of the video gambling game, and to determine a value payout associated with the outcome of the video gambling game. Each of the conventional gaming units also were programmed to display video images representing a video gambling game, which included a number of user-selectable video gambling games including video poker, video blackjack, video slots, video keno, video bingo, video pachinko games, video card games, video games of chance, and combinations thereof.

SUMMARY OF THE INVENTION

In one aspect, the invention is directed to a gaming system that is configured to allow a gaming tournament to be conducted. The gaming system may include a number of gaming units and a host computer. Each of the gaming units may include a value input device, a display unit that is capable of generating video images, and a gaming unit controller operatively coupled to the display unit and the value input device. The gaming unit controller may include a processor and a memory and may be programmed to allow a person to make a wager, to allow a person to select to play the gaming tournament as a single tournament player or a group tournament player, to allow a person to reserve a gaming unit for tournament play, to cause a video image representing a game to be generated on the display unit, and to cause a video image representing an advertisement to be generated on the display unit.

The host computer may be operatively coupled to the number of gaming units. The host computer may include a host interface unit having a camera, a speaker, a microphone, and a keypad, and be capable of receiving audio and/or visual and/or data input from a live person acting as a tournament host during the gaming tournament. The host computer may also include a host computer controller operatively coupled to the host interface unit. The host computer controller may include a processor and a memory operatively coupled to the processor of the host computer, and may be programmed to cause host data to be transmitted to at least one of the gaming units during the gaming tournament. The host data may be generated based on the audio and/or visual input and/or data received from the live person by the host interface unit during the gaming tournament. In addition, the gaming unit controller may be programmed to cause a host display image to be generated on the display unit, the host display image being generated from the host data.

In another aspect, the invention is directed to a gaming system that allows a gaming tournament to be conducted. The gaming system may include a host computer operatively coupled to a number of gaming units. The host computer may include a host computer controller including a processor and a memory operatively coupled to the processor of the host computer. Each of the number of gaming units may include a display unit capable of generating video images, a player interface unit capable of receiving audio and visual and data input from a tournament player, and a gaming unit controller operatively coupled to the display unit and the player interface unit. The gaming unit controller may include a processor and a memory operatively coupled to the processor of the gaming unit controller. The gaming unit controller may be programmed to cause player data to be transmitted from its gaming unit to the host computer during the gaming tournament. The player data may be generated based on audio and/or visual input received by the player interface unit during said gaming tournament. The gaming unit controller may also be programmed to allow a tournament players to make a wager, to cause a video image representing a game to be generated on the display unit, to allow a tournament player to reserve a gaming unit prior to the gaming tournament, and to cause a video image representing an advertisement to be generated on the display unit.

The video image may represent a game selected from the group of games of chance including video poker, video blackjack, video slots, video keno, video bingo, or pachinko, games of skills such as trivia games, or combinations of games of chance and skill.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 12 is an illustration of an embodiment of a visual display that may be displayed during performance of the slots routine of FIG. 14;

FIG. 13 is an illustration of an embodiment of a visual display that may be displayed during performance of the video keno routine of FIG. 15;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. §112, sixth paragraph.

Figure 1:
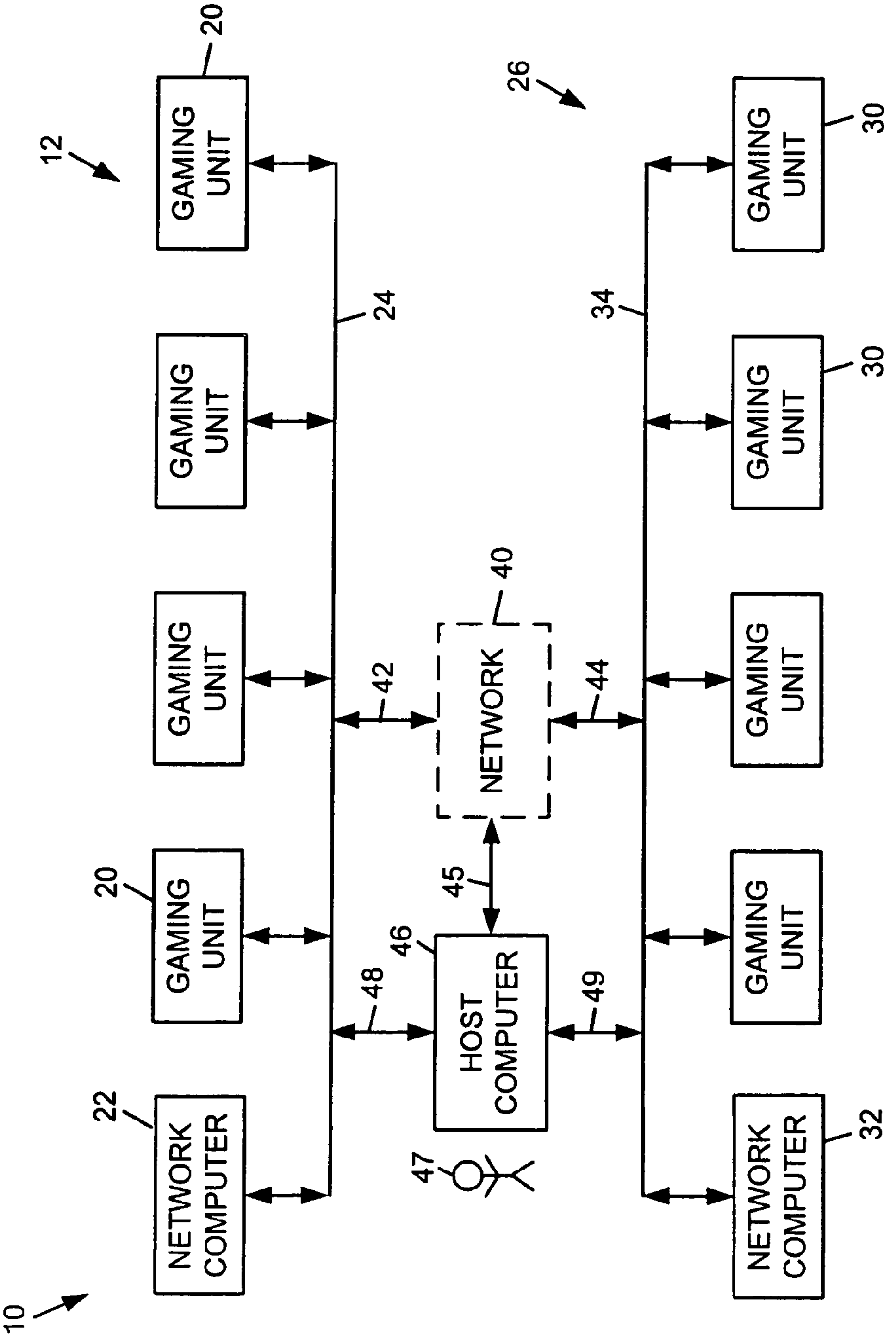
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The casino gaming system further includes a host computer 46 which may be utilized by a person acting as a host during a gaming tournament, herein referred to as a tournament host 47, to allow real-time interaction with tournament players that may be located locally or in other areas. The host computer 46 may be operatively coupled via a first host link 48 and a second host link 49 to the network computers 22,32 and/or one or more gaming units 20, 30, depending on the gaming tournament being played and the number of tournament players participating. In the alternate, the host computer 46 may also be directly coupled to the network 40 via a host network link 45.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol. Where the network 40 comprises a wireless network, data communication may take place over the communication links 42, 44 via a wireless data protocol such as CDMA2000 or W-CDMA. Similarly, where the first host link 48, the second host link 49, and the host network link 45 comprise the internet, data, voice and video communication may take place via an Internet communication protocol, and where the first host link 48, the second host link 49, and the host network link 45 comprise a wireless connection, data, voice, and video communication may take place via a wireless protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

A player selecting to play a casino game such as poker, keno, blackjack, slots, bingo, pachinko, card games, or any games of chance and the like, may chose individual play or tournament play. Tournament play may include various tournament modes such as single player mode or multiplayer mode, or teams. Tournament play may also include various tournament games, for example, games of chance such as slots, poker, blackjack, etc., games of skills such as trivia games, or combinations of games of chance and skill such as user-controlled reel-stop slot games, bonus games such as Family Feud®, Jeopardy®, Wheel-of-Fortune®, etc. Tournament play may also include a progressive type jackpot where tournament the prize amounts are proportional to the number of tournament players, the type of game, whether the prize is awarded as one large jackpot or smaller secondary jackpots, etc. In addition, tournament play may include multi-site tournaments where each site is made up of one or more teams. The teams may compete with each other in a round-robin type elimination until there is one remaining winning team. Thus, a team located in New Jersey can compete against teams in Las Vegas and Australia. In any event, if a player selects to participate in a gaming tournament, the casino gaming system 10 described above will enable the tournament host 47 to interact with tournament players, regardless of the proximity of the tournament players to the tournament host 47.

Host Computer Electronics

Figure 1A:
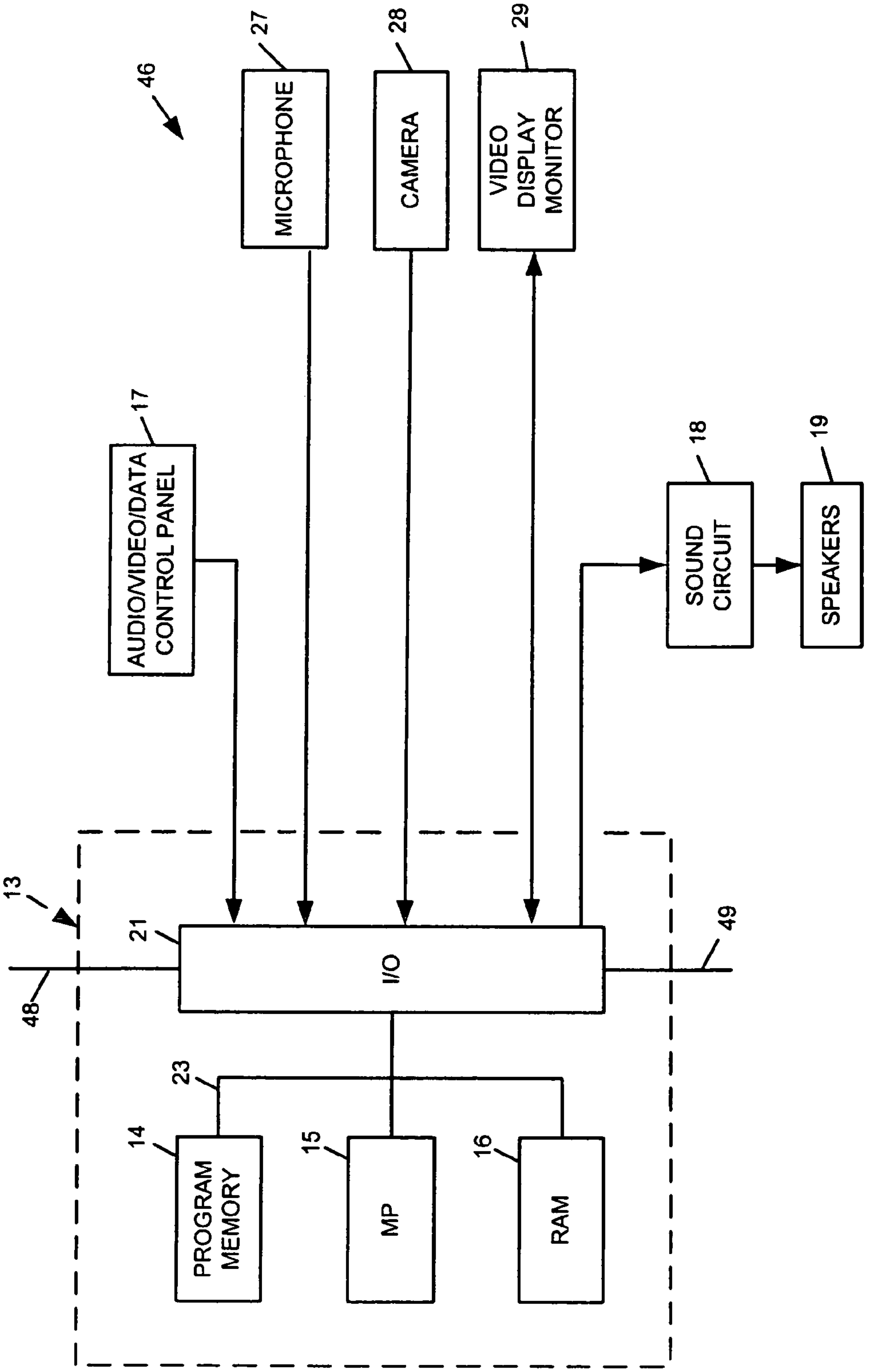
FIG. 1A is a block diagram of the electronic components of the host computer of FIG. 1.

FIG. 1A is a block diagram of the electronic components that may be incorporated in the host computer 46. Referring to FIG. 1A, the host computer 46 may include a host controller 13 that may comprise a program memory 14, a microcontroller or microprocessor (MP) 15, a random-access memory (RAM) 16 and an input/output (I/O) circuit 21, all of which may be interconnected via an address/data bus 23. It should be appreciated that although only one microprocessor 15 is shown, the host controller 13 may include multiple microprocessors 15. Similarly, the memory of the host controller 13 may include multiple RAMs 16 and multiple program memories 14. Although the I/O circuit 21 is shown as a single block, it should be appreciated that the I/O circuit 21 may include a number of different types of I/O circuits. The RAM(s) 16 and program memories 14 may be implemented as semiconductor memories, magnetically readable memories, and/or optically readable memories, for example.

FIG. 1A illustrates that an audio/visual/data control panel 17, a host microphone 27, a digital imaging device 28, for example, a camera, and a video display monitor 29 may be operatively coupled to the I/O circuit 21, each of those components being so coupled by either a unidirectional or bidirectional, single-line or multiple-line data link, which may depend on the design of the component that is used. A host speaker(s) 19 may be operatively coupled to a sound circuit 18, that may comprise a voice- and sound-synthesis circuit or that may comprise a driver circuit. The sound-generating circuit 18 may be coupled to the I/O circuit 21.

As shown in FIG. 1A, the components 27, 28, 29, 17, 18 may be connected to the I/O circuit 21 via a respective direct line or conductor. Different connection schemes could be used. For example, one or more of the components shown in FIG. 1A may be connected to the I/O circuit 21 via a common bus or other data link that is shared by a number of components. Furthermore, some of the components may be directly connected to the microprocessor 15 without passing through the I/O circuit 21.

Figure 1B:
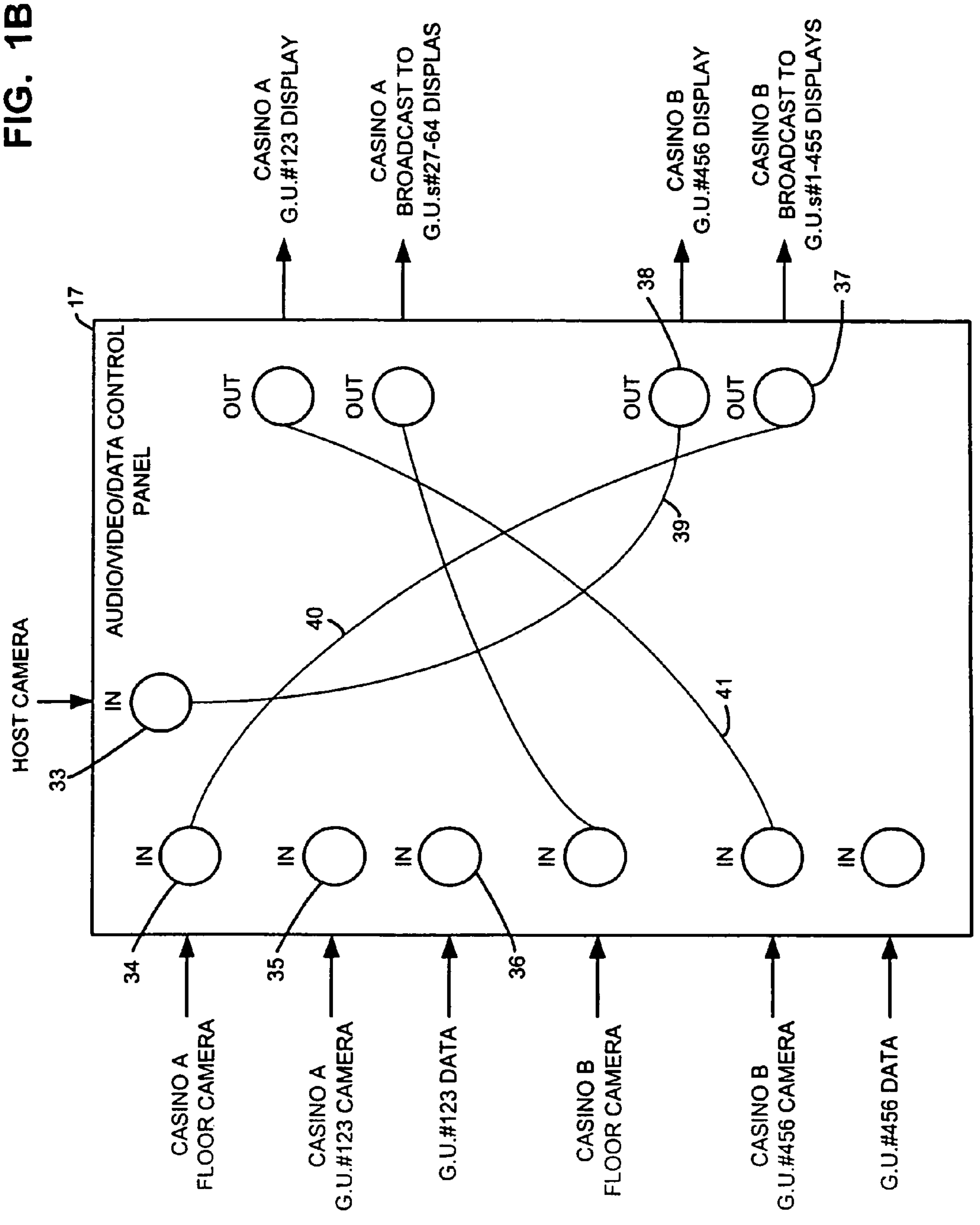
FIG. 1B is an exemplary illustration of an audio/video/data control panel that may be incorporated in the host computer.

FIG. 1B is an exemplary illustration of an embodiment block of the audio/video/data control panel 17 that may be incorporated in the host computer 46. The audio/video/data control panel 17 may include a number of input ports and output ports configured to allow the host 47 to interconnect selected inputs to selected outputs. The inputs may be selected by the host 47 from among many inputs including, inter alia, the host camera 28, the host microphone 27, numerous floor cameras placed strategically in the areas of the tournaments, gaming unit cameras such as the gaming unit camera 63, the gaming unit microphone 57, data generated by the gaming unit, and the outputs may include, inter alia, gaming unit display screens such as the display monitor 61 or the display unit 70, speakers such as the gaming unit speaker (s) 62, and the ticket printer 56.

Referring to FIG. 1B, the audio/video/data control panel 17 may include a host camera input 33, a Casino A floor camera input 34, a gaming unit #123 camera input 35, and a gaming unit #123 data input 36. Similarly, the audio/video/data control panel 17 may include a Casino B floor camera input, a gaming unit #456 camera input, and a gaming unit #456 data input. The audio/video/data control panel 17 may also include a series of gaming unit display monitors 37 corresponding to a series of gaming units numbered 1-455 located at a Casino B, and a single gaming unit display monitor 38 corresponding to a gaming unit numbered 456 located at the Casino B.

A number of closed circuit monitors (not shown) configured to display visual and/or audio signals from the host and the players may be located in close proximity to the tournament host 47 to allow the tournament host 47 to chose from among the various inputs. For example, if selected by the host 47, images captured by the host camera 28, as viewed on a closed circuit monitor by the host, may be routed to the video display monitor of the gaming unit identified as #456 via a host-to-player link 39. Similarly, images captured by a casino A floor camera, may be routed, via a broadcast link 40, to the display monitors of all of the gaming units participating in a particular gaming tournament, and images captured by a camera of the gaming unit identified as #456 may be routed, via a player-to-player link 41, to the display monitor of the gaming unit identified as #456

Gaming Unit

Figure 2:
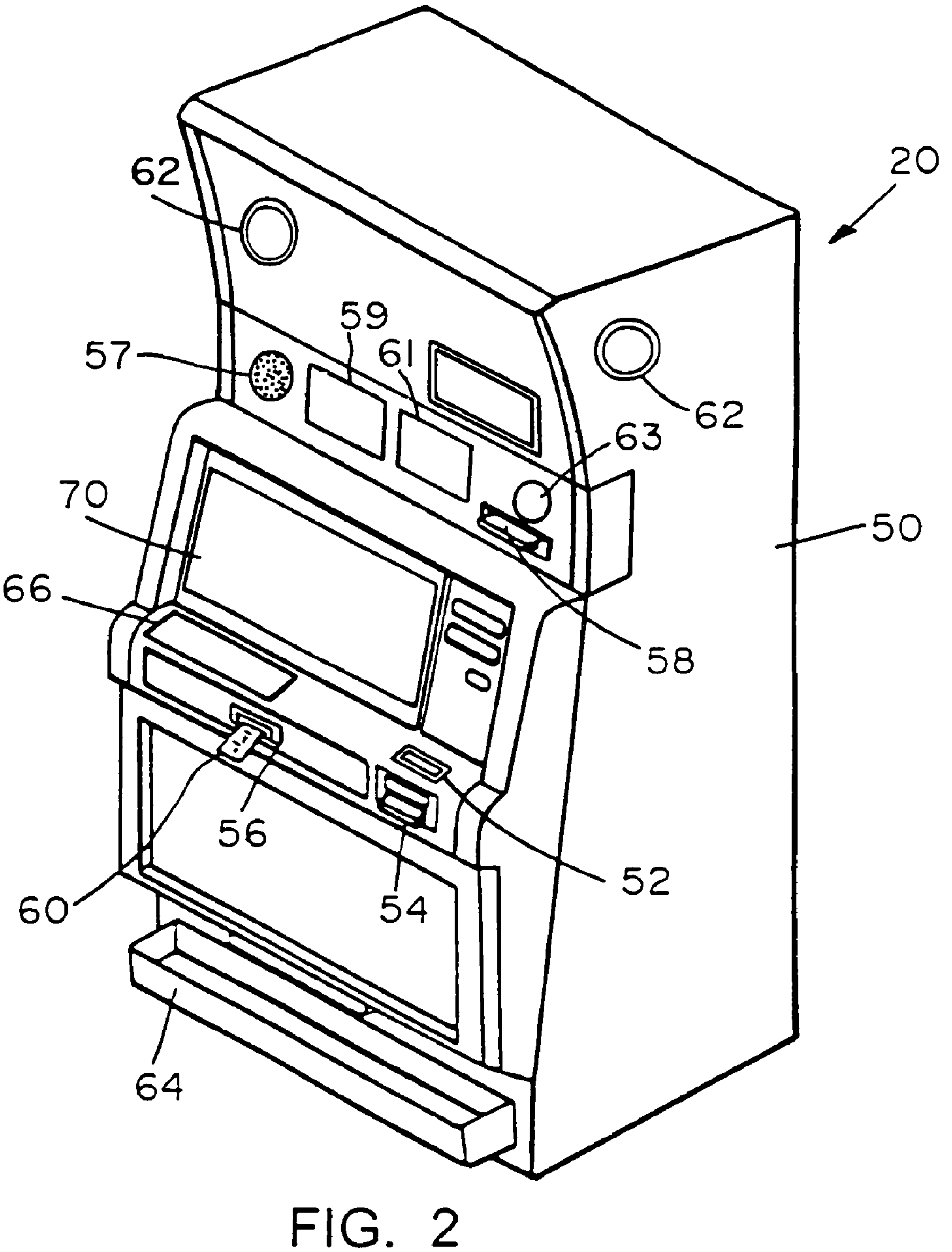
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print vouchers such as ticket voucher 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The color video display unit 70 may also be configured with touch-screen capability allowing a player to make selection. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

In addition, the casino gaming unit 20 may additional devices if it is not equipped with a computer-compatible built-in video screen, a digital imaging device, an audio input device, etc., capable of facilitating player/host event-driven interaction during a gaming tournament. The additional devices may include a microphone assembly 57, a touch screen display 59, video display monitor 61, a camera 63 or other type of digital imaging device, as well as other peripheral devices such as biometric devices capable of identifying a player. Although shown as separate components, the touch screen display 59 may be overlaid on the video display monitor 61 or the video display unit 70, thereby yielding a display monitor with touch sensor capability in addition to video display capability.

Figure 3:
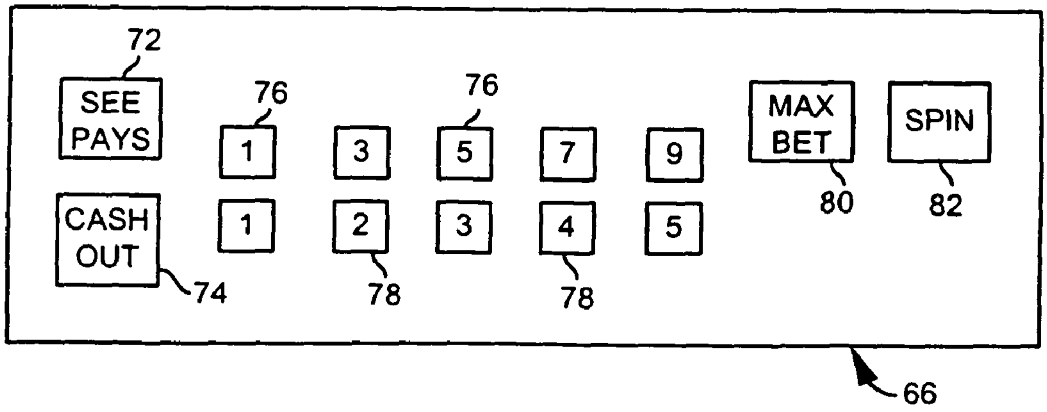
FIG. 3 illustrates an embodiment of a control panel for a gaming unit.

FIG. 3 illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the color video display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slot game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 3, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the color video display unit 70, it should be understood that the control panel 66 could be generated by the color video display unit 70. In that case, each of the buttons of the control panel 66 could be a colored area generated by the color video display unit 70, and some type of mechanism may be associated with the color video display unit 70 to detect when each of the buttons was touched, such as a touch-sensitive screen.

Gaming Unit Electronics

Figure 4:
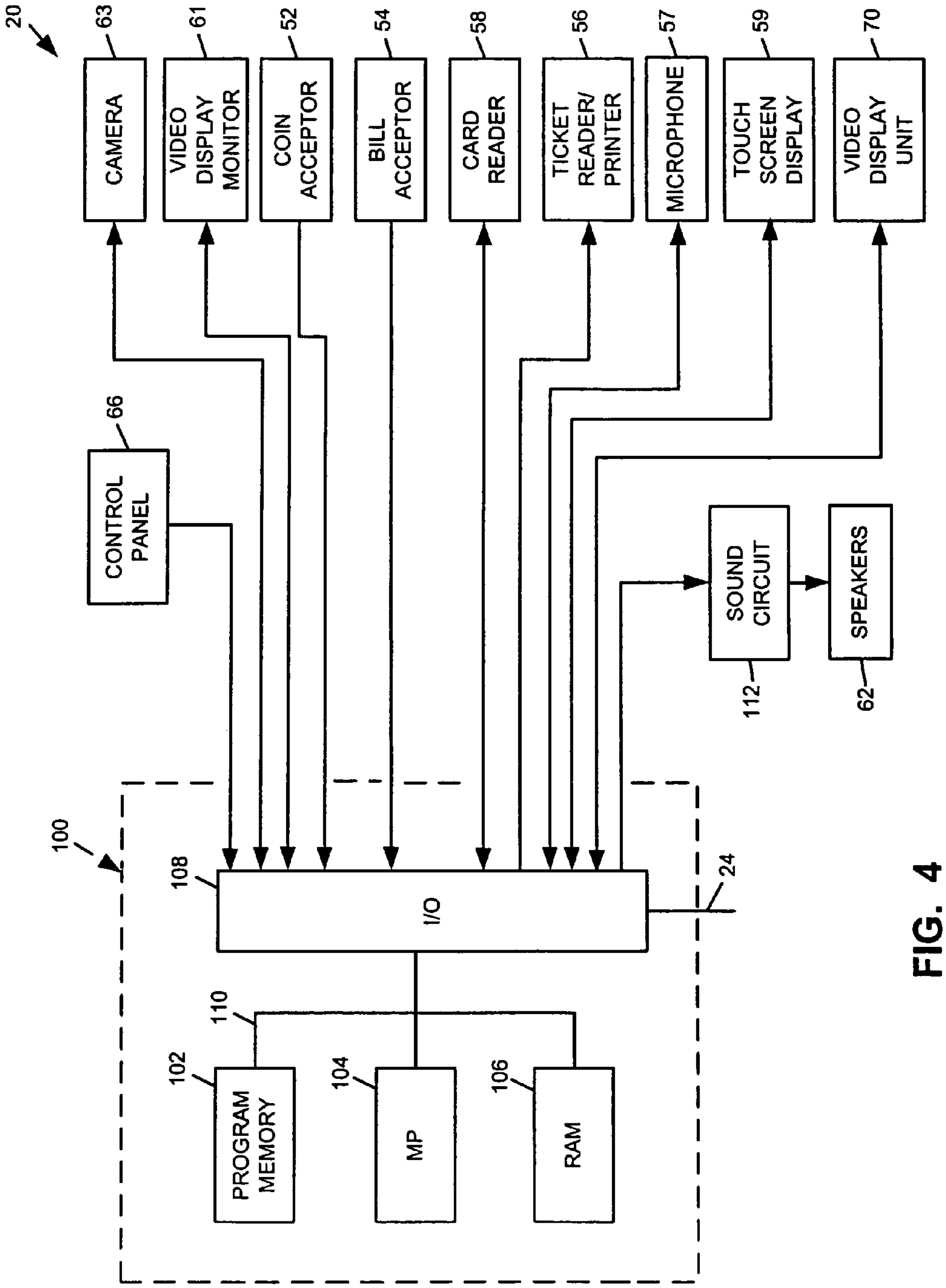
FIG. 4 is a block diagram of the electronic components of the gaming unit of FIG. 3.

FIG. 4 is a block diagram of a number of components that may be incorporated in the gaming unit 20. Referring to FIG. 4, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 4 illustrates that the control panel 66, the video display unit 70, the coin acceptor 52, the bill acceptor 54, the card reader 58 and the ticket reader/printer 56, the microphone 57, the touch screen display 59, the video display monitor 61, the video display unit, and the camera 63 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 4, the components 52, 54, 56, 57, 58, 59, 61, 63, 66, 70, 112 may be connected to the I/O circuit 108 via a respective direct line or conductor. Different connection schemes could be used. For example, one or more of the components shown in FIG. 4 may be connected to the I/O circuit 108 via a common bus or other data link that is shared by a number of components. Furthermore, some of the components may be directly connected to the microprocessor 104 without passing through the I/O circuit 108.

Tournament Operation

The tournament host 47 may interact with a tournament player(s) via the audio/visual/data control panel 17, the host speaker(s) 19, the host microphone 27, the host camera 28, and/or the host video display monitor 29 of the host computer 46. Tournament host to tournament player interaction (host/player) may include, for example, coordinating the gaming tournament among the players, instructing the tournament players, broadcasting conversations to tournament players, edited or not, between the host and other tournament, broadcasting an audio and/or video feed showing a tournament player's elation in order to increase a level of excitement among the tournament players. In addition, the host/player interaction may include the host providing a selection of audio and/or visual video feed to other tournament players or hosts that shows. The selection may include, for example, tournament players interacting with the host during the gaming tournament, tournament players interacting with each other, as well as a variety of other tournament scenarios. The tournament players may then select to view one or more video feeds from among numerous video feeds. Similarly, other tournament hosts may select to broadcast one or more of the audio and/or video feeds, and may, if desired, add their own commentary to the audio and/or video feeds. Further, the tournament host 47 can broadcast real-time tournament player information during the gaming tournament. The information may include, but is not limited to, general player information such as where a player is from, player performance statistics such as a player in New Jersey is winning the slot tournament by 5000 points, etc.

The host microphone 27 may be configured to capture audio input from the tournament host 47 located at the host computer 46. The host controller 13 may then convert the audio input to "host data," suitable for transmission to the gaming unit 20. Upon receipt, the gaming unit controller 100 may then convert the host data to sounds, broadcast to the tournament player(s) by the speakers 62 mounted on the gaming unit 20. Conversely, the host speaker(s) 19 are configured to enable the tournament host 47 to hear projected sounds aurally conveyed to him from the tournament players during the gaming tournament.

Similarly, the host video display monitor 29 may be configured to allow the tournament host 47 to view a number of images including live and recorded images. For example, via the audio/visual/data control panel 17 discussed in connection with FIG. 1B, the host video display monitor 29 may allow the tournament host 47 to switch to, and view live images of the tournament player(s) playing the gaming tournament. The live images may include, for example, images of the tournament player(s) receiving instructions from the tournament host 47, images of the tournament player(s) asking questions of the tournament host 47, or simply images of the facial expressions of tournament player(s) during the gaming tournament. In another example, the host video display monitor 29 may allow the tournament host to review video feed and then select, via the use of the audio/visual/data control panel 17, to broadcast the video feed to tournament players. The video feed may include video images of tournament players playing the gaming tournament, for example, an instant replay of a tournament winner's expression, and/or video images of intermingling between one or more tournament players and the tournament host 47 during the gaming tournament. In addition, other types of images may also be contemplated for display on the host display monitor 29. Moreover, the tournament host 47 may also select to superimpose text on the video feed using the audio/visual/data control panel 17. For example, the tournament host 47 may superimpose the scores of the tournament players, reward points, the time, etc. on video feeds broadcast during the tournament. Accordingly, the tournament host 47 may switch among the various images to be displayed on the host display monitor 29 via the audio/visual/data control panel 17.

The host camera 28 or other digital imaging device may be configured to capture visual images of the-tournament host 47 located at the host computer 46. The host controller 13 may then convert the visual image to host data which is transmitted to the one or more tournament players located at the gaming units participating in the gaming tournament. The gaming unit controller 100 may then convert the host data to a visual image suitable for viewing by the tournament player(s) on the video display monitor 61. The host camera 28 may also be configured to allow visual images of live host/player interaction to be captured and transmitted to the video display monitor 61 of gaming unit 20. Typically, the visual images will be accompanied by corresponding audio feed and data feed such as a score, a time, a list of top players, etc.

The tournament player(s) may interact with the tournament host 47 via the control panel 66, the microphone assembly 57, the touch screen display 59 or the color video display unit 70 with touch screen capability, the video display monitor 61, the camera 63 or other type of digital imaging device, as well as other peripheral devices such as biometric devices capable of identifying a player. As mentioned above, the microphone assembly 57, the touch screen display 59, the video display monitor 61, and the camera 63 may be attached to the gaming unit 20 in any suitable fashion, or may be built into the gaming unit 20. In addition, the video display monitor 61 and the color video display unit 70 may be combined into one display unit housed in the gaming unit 20. Similarly, the touchscreen display 59 may also be combined with the color video display unit 70 in the gaming unit 20, or may be combined with the video display monitor 61.

The microphone assembly 57 may be configured to capture audio input from a tournament player(s) located at the gaming machine 20. The gaming unit controller 100 may then convert the audio input to "player data," suitable for transmission to the host computer 46. Upon receipt, the host controller 18 may then convert the player data to sounds, broadcast to the tournament host 47 by the host speakers 19 mounted in the host computer 46. The tournament host 47 may then record the sounds, associated with the player's audio input, for playback to other players or may simply use the sounds to monitor the tournament player's enjoyment of the gaming tournament. The tournament host 47 may also place players "calling in" in a queue, much like a radio talk show. Conversely, the speaker(s) 62 is configured to enable a tournament player to hear projected sounds aurally conveyed to him, including, for example, real-time voice instructions and updates from the tournament host during the gaming tournament, audio recordings of other tournament players, and audio recordings of conversations between one or more tournament players and the tournament host 47.

Similarly, the video display monitor 61 may be configured to allow a player to view a number of images including real-time and recorded images. For example, the video display monitor 61 may allow a player to view live, as in real-time, images of the tournament host 47 hosting the gaming tournament. The live images of the tournament host 47 may include, for example, images of the tournament host 47 giving tournament playing instructions to the players or simply images of the tournament host cheering for a particular tournament player. In another example, the video display monitor 61 may allow a player to view video feed, coordinated and provided by the tournament host 47 located at the host computer 46. The video feed may include video images of other tournament players playing the gaming tournament, for example, an instant replay of a tournament winner's expression, and/or video images of intermingling between one or more tournament players and the tournament host 47 during the gaming tournament. In addition, other types of images may also be contemplated for display on the video display monitor 61. Accordingly, the tournament host 47 may switch among the various images to be displayed on the video display monitor 61, depending on the tournament circumstances, location of players, etc.

For exemplary purposes, both the color video display unit 70 suitable for generating video images of games, and the video display monitor 61 suitable for generating images of the tournament host 47 as well as images and video feed of other tournament related images, are shown in FIG. 2. It should be understood, however, that the gaming unit 20 may be configured with one video display unit that is capable of generating both the video images of games as well as tournament host images and other tournament related images via any number of well known means. For example, the video display unit 70 may be configured with picture-in-picture capability that allows a tournament player to concurrently view two or more image screens.

The camera 63 or other digital imaging device may be configured to capture visual images of a tournament player(s) located at the gaming machine 20. The gaming unit controller 100 may then convert the visual image to player data which is transmitted to the host computer 46. The host controller 13 may then convert the player data to a visual image suitable for viewing by the tournament host 47 on the host display monitor 29. The host controller 13 may also convert the player data to a recorded visual image. The recorded visual image may then be viewed by the tournament host 47 on the host display monitor 29 and/or a tournament player(s) on the video display monitor 61. Similarly, if player(s) and the tournament host 47 are co-located, the camera 63 may also be configured to allow images of host/player interaction to be captured and transmitted to the host computer 46. The images of both the individual tournament players, and the images of tournament player/host interaction may them be provided by the tournament host 47 to other tournament players via their video display monitors.

As previously mentioned in connection with FIG. 2, if provided for player tracking purposes, the card reader 58 may be used to read data from, and/or write data to, player tracking cards that are capable of storing data representing the identity of a player, the identity of a casino, the player's gaming habits, etc. Of course, the card reader 58 as well as any other biometric input device capable of identifying the player, may be also used to identify a player participating in a gaming tournament for purposes of inclusion in any video and/or audio feed. Although a player may wish to be identified for awards purposes, he may wish, however, to remain anonymous for all other purposes. In such a case, the tournament host 47 will enable a tournament player's anonymity during the gaming tournament using a number of different techniques including, for example, by either disabling or prompting the player to disable the camera 63 mounted on the gaming unit 20.

The touch screen display 59 shown in FIG. 2 may be a resistive based touch screen, a capacitive based touch screen, a surface acoustic wave touch screen, or any other type touch screen capable of allowing a player to enter player information and navigate through the gaming unit services. The touch screen display may include alpha-numeric symbols, function keys and hand-writing recognition capabilities. The touch screen may be activated by a tournament player using a finger or stylus and use LED's or vacuum flourescent display (VFD) technology to display a alphanumerical text, however, a color LCD display screen may be preferable over an LED or VFD screen to allow for the display of symbols and images as well as alphanumeric characters. In addition to LEDs, VFDs and LCDs, a touch screen may be used with a plasma display screen, a CRT display as well as other conventional display technology. It should be noted, that although not shown in connection with FIG. 1A, a touchscreen may also be provided to the tournament host 47 at host computer 46.

Recently, advances in player tracking units which are used to identify and reward players based upon their previous game play history, have provided an option to the addition of a separate speaker/microphone assembly and a separate touch screen to a conventional gaming unit. Details of player tracking units which may be utilized to provide a touch screen similar to the touch screen described above are detailed in a U.S. patent application Ser. No. 09/961,051, filed Sep. 20, 2001, by Paulsen, et al., titled "Game Service Interfaces for Player Tracking Touch Screen Display," which is incorporated in its entirety and for all purposes. Details of player tracking units which may provide a speaker/microphone similar to the speaker/microphone described above as well as a touch screen similar to the touch screen described above are detailed in a U.S. patent application Ser. No. 09/921,489 filed Aug. 03, 2001, by Hedrick, et al., titled "Player Tracking Communication Mechanisms in a Gaming Machine," which is incorporated in its entirety and for all purposes.

It should be understood that gaming unit 20 is but one example from a wide range of gaming unit designs that may be used. For example, some gaming machines are configured with a top box, which sits on top of the cabinet 50. The box top may house a number of devices which may be used to add features to a game being played on the gaming unit 20 including additional speakers, a ticket printer, an additional touch screen, and the like. Some gaming units have two or more game displays-mechanical and/or video, some gaming units are designed for bar tables and have displays that face upwards. Further, some gaming machines may be designed for cashless systems and may not include features such as bill validators, coin acceptors and tray coins. Instead, they may only have ticket readers, card readers, and ticket dispensers.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32 having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 5A:
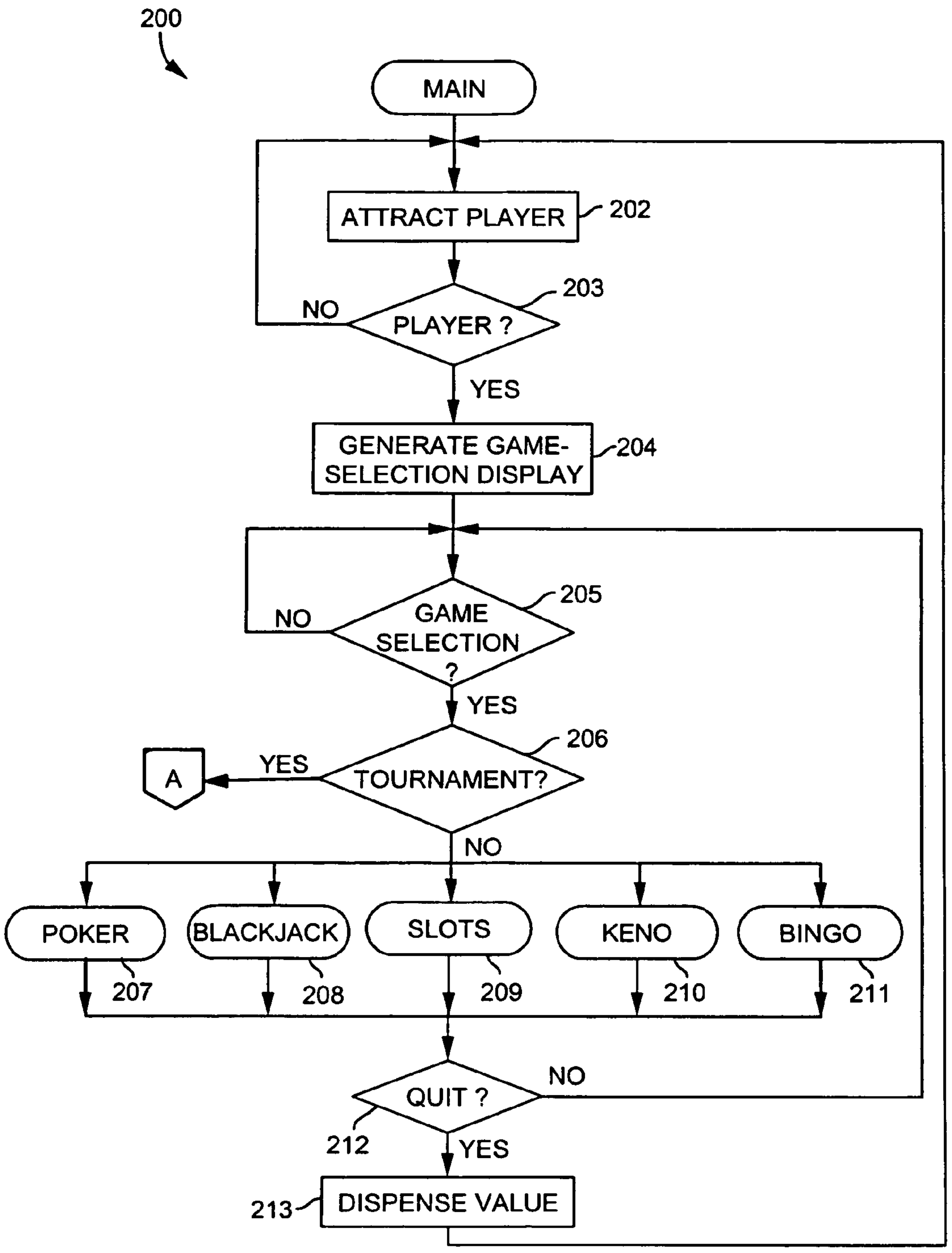
FIG. 5A-5F is a flowchart of an embodiment-of a main routine that may be performed during operation of one or more of the gaming units.

FIG. 5A-5F is a flowchart of an embodiment of a main routine 200 that may be stored in the memory of the controller 100. Referring to FIG. 5A, the main routine 200 may begin operation at block 202 during which an attraction sequence may be performed in an attempt to induce a potential player in a casino to play the gaming unit 20. The attraction sequence may be performed by displaying one or more video images on the color video display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, video pachinko games, video card games, video games of chance, and combinations thereof. The attraction sequence may also include an option for an individual player to participate in a gaming tournament, with or against other individual players.

During performance of the attraction sequence, if a potential player makes any input to the gaming unit 20 as determined at block 203, the attraction sequence may be terminated and a game-selection display may be generated on the color video display unit 70 at block 204 to allow the player to select a game available on the gaming unit 20. The gaming unit 20 may detect an input at block 203 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; the gaming unit 20 could determine if player has inserted a player card into the card reader 58; the gaming unit 20 could determine if player entered his player identification information via the touch screen display 59, etc.

The game-selection display generated at block 204 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of a game by the player as determined at block 205, the controller 100 may cause an additional game selection option at block 206, allowing the player the option to participate in a gaming tournament. If the player chooses to participate in a gaming tournament, gaming tournament choices may be presented to the player by displaying one or more video images of tournament games on the color video display unit 70 and/or causing one or more sound segments, such as voice or music, to be generated via the speakers 62.

If the individual player selects the options to play the game individually, the controller 100 may cause one of a number of game routines to be performed to allow the selected game to be played. For example, the game routines could include a video poker routine 207, a video blackjack routine 208, a slots routine 209, a video keno routine 210, and a video bingo routine 211. At block 205, if no game selection is made within a given period of time, the operation may branch back to block 202.

After one of the routines 207, 208, 209, 210, 211 has been performed to allow the player to individually play one of the games, block 212 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 213 based on the outcome of the game(s) played by the player. The operation may then return to block 202. If the player did not wish to quit as determined at block 212, the routine may return to block 205 where the game-selection display may again be generated to allow the player to select another game.

It should be noted that although five gaming routines are depicted in FIG. 5A, a different number of routines could be included to allow play of a different number of games. The gaming unit 20 may also be programmed to allow play of different games including, but not limited to, various tournament games, for example, games of chance, games of skills such as trivia games, or combinations of games of chance and skill, etc.

Figure 5B:
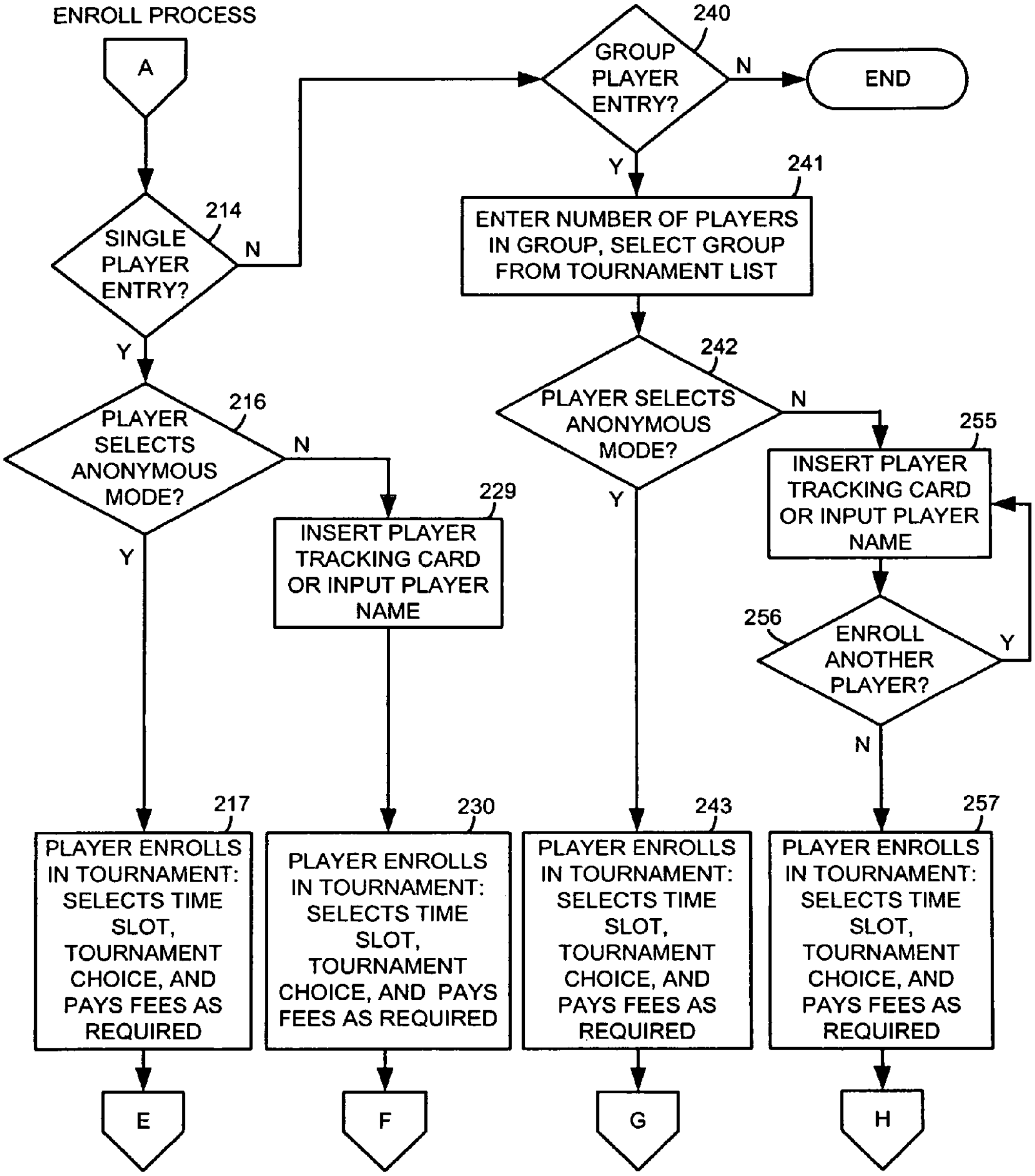
Figure 5C:
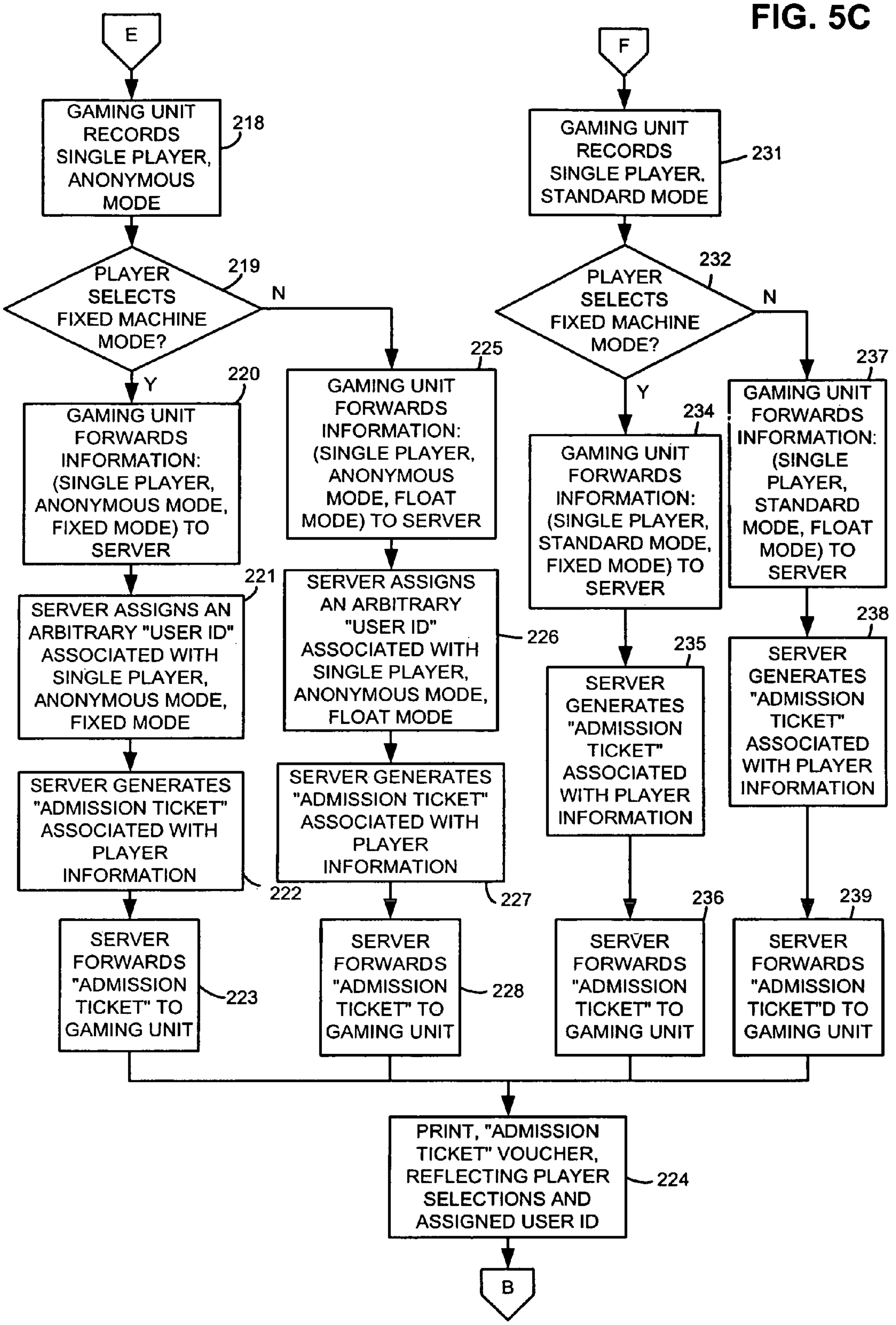

If the player selects to participate in a gaming tournament at block 206, he may complete an enrollment process as shown in FIGS. 5B and 5C. The enrollment process begins at block 214 where it is determined if the player is a single player entry at block 214. Selection of the single player entry is appropriate where a player wishes to participate in a tournament but is not enrolling in the tournament as part of a group. Selection of the single player entry may also be appropriate in those cases where a single player intends to join group of players, for example, to join a group of female players to compete against a group of male players, to join a group of players from Chicago to compete against a group of players from Wisconsin, etc. If it is determined that the player has chosen to participate in the gaming tournament as a single player entry, the player determines whether he would like to remain anonymous throughout the gaming tournament at block 216.

If the player chooses to remain anonymous at block 216, the player may enroll in the tournament via the touchscreen display 59 or the color video display unit 70 with touch screen capability, the video display monitor 61, the button operated control panel 66, or a combination thereof, depending on the configuration of the gaming unit 20. The player may enroll in the tournament at block 217 by choosing a particular type of tournament, for example, a slots tournament where the winner among multiple players playing slots is determined by the number of points he accrues during a predetermined time period, by selecting a time slot which may or may not be within the hour, and by paying fees as required. The player may select a tournament time slot via a number of interfaces including, for example, the touch screen 59 or the color video display unit 70 with touch screen capability, the control panel 66 depicted as a button panel in FIG. 3, a scantron type form, a voice input, etc Referring to FIG. 5C, after the tournament type and time slot have been selected and the fees paid, the player may then enter his tournament preferences into the gaming unit 20, via the touchscreen display 59 or the color video display unit 70 with touch screen capability, the video display monitor 61, the button operated control panel 66, or a combination thereof, depending on the configuration of the gaming unit 20. The players tournament preferences may include participating in the tournament as a single player in an anonymous mode. The gaming unit 20 records the player's preference to participate in the tournament as an anonymous, single player, at block 218. Next, at block 219, it is determined whether the player has a preferred gaming unit he would like to use during the gaming tournament. If the player desires to reserve, or fix, a particular gaming unit for the tournament, he may select the "fixed machine mode" option at block 219.

Upon player selection of the fixed mode option, at block 220, the gaming unit forwards the player's selections (e.g. single player, anonymous mode, fixed machine mode, tournament type, tournament time, etc.) to a network computer server such as network computer 22. Due to the player's request for anonymity, a user identification number (User ID) associated with the player's selections is assigned at block 221. In response, at block 222, the network computer 22 assigns a session identification number (Session ID) associated with the player's selections, and generates an "admission ticket" displaying the players selections as well as other information, including a bar code, needed to allow player entry into the tournament. The network computer 22 then forwards the admission ticket to player via the gaming unit 20 at block 223. At block 224, the ticket printer 56 may then print the admission ticket, or tournament admission voucher, reflecting the player's selections and the assigned User ID.

Figure 6A:
FIG. 6A is an exemplary tournament voucher ticket that may be used by an anonymous single player enrolled in a gaming tournament while located at a reserved gaming unit during performance of the main routine.

FIG. 6A is an exemplary tournament admission voucher 284 that may be printed at the gaming unit 20. The tournament admission voucher 284 includes, among other things, a tournament date and time 285, the time of the tournament enrollment 286 by the player, the player, or User ID 287, fixed mode notation 288 including the reserved gaming unit machine number, and a session number 289.

Returning to block 219, if the player does not select the fixed gaming machine mode, indicating that he does not wish to reserve a gaming unit during tournament play, it may be assumed that the player has selected a "float machine mode" by default. The float machine mode allows a player to select any open tournament gaming machine of their choice at the time of the tournament. Upon a determination of the float machine mode option, the gaming unit forwards the player's selections (e.g. single player, anonymous mode, float machine mode, tournament type, tournament time, etc.) to the network computer 22. Due to the player's request for anonymity, a User ID associated with the player's selections is assigned at block 226. In response, at block 227, the network computer 22 assigns a Session ID associated with the player's selections, and generates an "admission ticket" displaying the players selections as well as other information, including a bar code, needed to allow player entry into the tournament. The network computer 22 then forwards the admission ticket to the player via the gaming unit 20 at block 228. At block 224, the ticket printer 56 may then be print tournament admission voucher, reflecting the player's selections and the assigned User ID.

Figure 6B:
FIG. 6B is an exemplary tournament voucher ticket that may be used by a non-anonymous single player enrolled in a gaming tournament while located at a reserved gaming unit during performance of the main routine.
Figure 6C:
FIG. 6C is an exemplary tournament voucher ticket that may be used by an anonymous group player enrolled in a gaming tournament while located at a suitable gaming unit of choice during performance of the main routine.

FIG. 6C is an exemplary tournament admission voucher 292 that may be printed at the gaming unit 20. The tournament admission voucher 292 includes, among other things, a float mode notation 293 indicating that the player may choose any suitable gaming unit for tournament play, and a bar code 294 encoded with all necessary information associating the player with his tournament preferences, etc. In addition, the tournament admission voucher ticket includes machine the tournament date and time, the time of the tournament enrollment by the player, the player or User ID, the fee paid, and a session number.

If the player does not choose to remain anonymous at block 216, the player may enroll in the tournament via inserting his/her player tracking card in the card reader 58 at block 229. In the alternative, the player may input his/her player name via the touchscreen display 59 or the color video display unit 70 with touch screen capability, the video display monitor 61, the button operated control panel 66, or a combination thereof, depending on the configuration of the gaming unit 20. Use of the player tracking card allows fees for the gaming tournament to be transferred from the player account or allows credits to be transferred to the player account via the network computer 22. The player may continue to enroll in the tournament at block 230 by choosing a particular type of tournament, for example, a slots tournament where the winner among multiple players playing slots is determined by the number of points he accrues during a predetermined time period, by selecting a time slot which may or may not be within the hour, and by paying fees as required.

Referring to FIG. 5C, after the tournament and time slot has been selected and the fees paid, the player may enter his tournament preferences into the gaming unit 20 via the touchscreen display 59 or the color video display unit 70 with touch screen capability, the button operated control panel 66, or a combination thereof, depending on the configuration of the gaming unit 20. The player's tournament preferences may include participating in the tournament as a single player playing in a standard mode. The gaming unit 20 records the player's preferences to participate in the tournament as a standard, single player, at block 231. Next, at block 232, it is determined whether the player has a preferred gaming unit he would like to use during the gaming tournament. If the player desires to reserve, or fix, a particular gaming unit for the tournament, he may select the "fixed machine mode" option at block 232.

Upon player selection of the fixed mode option, the gaming unit forwards the player's selections (e.g. single player, standard mode, fixed machine mode, tournament type, tournament time, etc.) to the network computer 22. In response, at block 235, the network computer 22 generates an "admission ticket" containing the players selections as well as other information needed to allow player entry into the tournament, including a Session ID associated with the player's selections. The network computer 22 then forwards the admission ticket to player via the gaming unit 20 at block 236. At block 224, the ticket printer 56 may then print the tournament admission voucher including the player's name and the Session ID, and reflecting the player's selections.

FIG. 6B is an exemplary tournament admission voucher 290 that may be printed at the gaming unit 20. The tournament admission voucher 290 includes, among other things, a player identification name 291, indicating that the player either inserted his/her player tracking card, or manually entered their player name at block 229. The tournament admission ticket voucher 290 also includes the tournament date and time, the time of the tournament enrollment by the player, fixed mode notation including the reserved gaming unit machine number, and a session number.

Returning to block 232, if the player does not select the fixed gaming machine mode, indicating that he does not wish to reserve a gaming unit during tournament play, it may be assumed that the player has selected a "float machine mode" by default. Upon a determination of the float machine mode option, at block 237 the gaming unit forwards the player's selections (e.g. single player, standard mode, float machine mode, tournament type, tournament time, etc.) to the network computer 22. In response, at block 238, the network computer 22 generates an "admission ticket" containing the players selections as well as other information needed to allow player entry into the tournament including a Session ID associated with the player's selections. The network computer 22 then forwards the admission ticket to player via the gaming unit 20 at block 239. At block 224, the ticket printer 56 may then print the admission ticket, or tournament admission voucher, reflecting the player's selections, the player's name and the associated Session ID.

Figure 6D:
FIG. 6D is an exemplary tournament voucher ticket that may be used by a non-anonymous group player enrolled in a gaming tournament while located at a suitable gaming unit of choice during performance of the main routine.

FIG. 6D is an exemplary tournament admission voucher 295 that may be printed at the gaming unit 20. The tournament admission voucher 295 includes, among other things, a float mode notation, the tournament date and time, the time of the tournament enrollment by the player, the player identification name, the fee paid, and the session number.

Returning to block 214 of FIG. 5B, if the player chooses not to participate in the gaming tournament as a single player entry, the player determines whether he would like to participate in the gaming tournament as a group player entry. The group player entry is appropriate where a player or a number of players wishes to join a group of players, for example, a group of female players, a group of players from Chicago, etc. If the group player entry is chosen at block 241, the group player(s) selects a tournament group from a list of groups, and then enters the number of player(s) joining that particular group via the touchscreen display 59 or the color video display unit 70 with touch screen capability, the video display monitor 61, the button operated control panel 66, or a combination thereof, depending on the configuration of the gaming unit 20.

In the alternative, if the group player entry is chosen at block 241, the group player(s) may select a group from a list of groups, may enter the number of player(s) joining that particular group, and may receive a group identification number associated with the group and selects a tournament time slot via a number of interfaces including, for example, the touch screen 59 or the color video display unit 70 with touch screen capability, the control panel 66 depicted as a button panel in FIG. 3, a scantron type form, a voice input, etc. Next, if it is determined that a player has chosen to participate in the gaming tournament as a group player entry, the player determines whether he would like to remain anonymous throughout the gaming tournament at block 242.

If the player chooses to remain anonymous at block 242, the player may enroll in the tournament via the touchscreen display 59 or the color video display unit 70 with touch screen capability, the video display monitor 61, the button operated control panel 66, or a combination thereof, depending on the configuration of the gaming unit 20. The player may enroll in the tournament at block 243 by choosing a particular type of tournament, by selecting a time slot which may or may not be within the hour, and by paying fees as required.

Figure 5D:
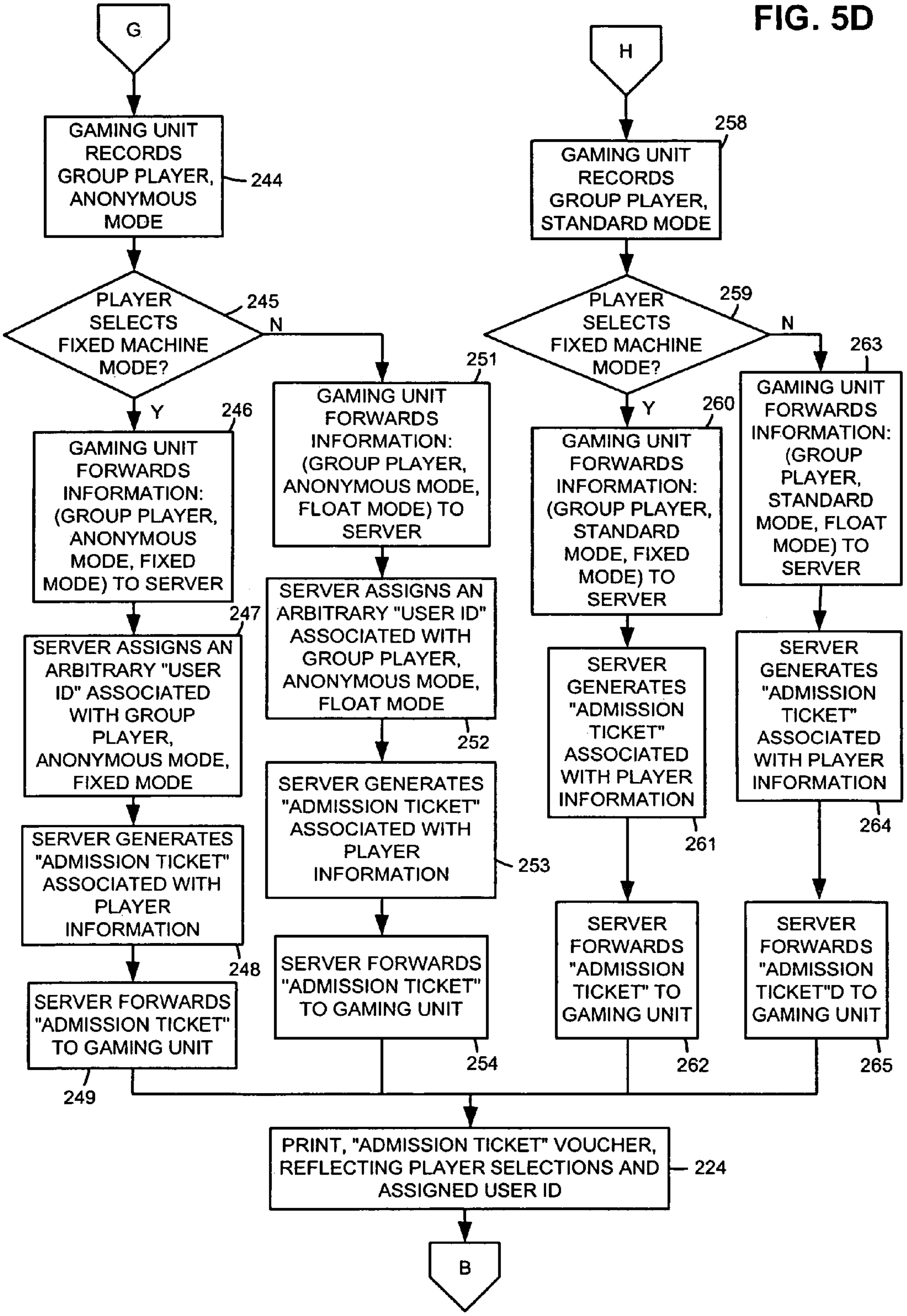

Referring to FIG. 5D, after the tournament type and time slot have been selected and the fees paid, the player may enter his tournament preferences into the gaming unit 20 via the touchscreen display 59 or the color video display unit 70 with touch screen capability, the video display monitor 61, the button operated control panel 66, or a combination thereof, depending on the configuration of the gaming unit 20. The player's tournament preferences may include participating in the tournament as a group player entry playing in an anonymous mode. The gaming unit 20 records the player's preferences to participate in the tournament as an anonymous, group player, at block 244. Next, at block 245, it is determined whether the player has a preferred gaming unit he would like to use during the gaming tournament. If the player desires to reserve a particular gaming unit for the tournament, he may select the "fixed machine mode" option at block 245.

Upon player selection of the fixed mode option, the gaming unit forwards, at block 246, the player's selections (e.g. group player, anonymous mode, fixed machine mode, tournament type, tournament time, etc.) to a network computer server such as network computer 22. Due to the player's request for anonymity, a User ID associated with the player's selections is assigned at block 247. In response, at block 248, the network computer 22 assigns a Session ID, and generates an "admission ticket" containing the players selections as well as other information needed to allow player entry into the tournament. The network computer 22 then forwards the admission ticket to player via the gaming unit 20 at block 249. At block 224, the ticket printer 56 may then print the admission ticket, or tournament admission voucher, reflecting the player's selections and the assigned User ID.

Returning to block 245, if the player does not select the fixed gaming machine mode, indicating that he does not wish to reserve a gaming unit during tournament play, it may be assumed that the player has selected a "float machine mode" by default. Upon a determination of the float machine mode option, the gaming unit forwards the player's selections (e.g. group player, anonymous mode, float machine mode, tournament type, tournament time, etc.) to the network computer 22. Again, due to the player's request for anonymity, a User ID associated with the player's selections is assigned at block 252. In response, at block 253, the network computer 22 assigns a Session ID, and generates an "admission ticket" containing the players selections as well as other information needed to allow player entry into the tournament. The network computer 22 then forwards the admission ticket to player via the gaming unit 20 at block 254. At block 224, the ticket printer 56 may then print the admission ticket, or tournament admission voucher, reflecting the player's selections and the assigned User ID.

If the player does not choose to remain anonymous at block 242, the player may enroll in the tournament via inserting his player tracking card in the card reader 58 at block 255. In the alternative, the player may input his player name via the touchscreen display 59 or the color video display unit 70 with touch screen capability, the video display monitor 61, the button operated control panel 66, or a combination thereof, depending on the configuration of the gaming unit 20. Use of the player tracking card allows fees for the gaming tournament to be transferred from the player account or allows credits to be transferred to the player account via the network computer 22. At this point, the player may wish to enroll additional players to form a group, at block 256. At block 255, the additional players may simply insert their player tracking cards, one by one, or may enter the player identification name, one by one, until their group is complete. Upon completion of entry of the group members identity, the player(s) may continue to enroll in the tournament at block 257 by choosing a particular type of tournament, by selecting a time slot which may or may not be within the hour, and by paying fees as required.

Referring to FIG. 5D, after the tournament type and time slot has been selected and the fees paid, the player(s) may enter his tournament preferences into the gaming unit 20 via the touchscreen display 59 or the color video display unit 70 with touch screen capability, the video display monitor 61, the button operated control panel 66, or a combination thereof, depending on the configuration of the gaming unit 20. The tournament preferences may include participating in the tournament as a group player in a standard mode. The gaming unit 20 records then the player(s) wishes to participate in the tournament as a standard, group player, at block 258. Next, at block 259, it is determined whether the player has a preferred gaming unit he would like to use during the gaming tournament. If the player desires to reserve, or fix, a particular gaming unit for the tournament, he may select the "fixed machine mode" option at block 259.

Upon player selection of the fixed mode option, the gaming unit forwards the player's selections (e.g. group player, standard mode, fixed machine mode, tournament type, tournament time, etc.) to the network computer 22. In response, at block 261, the network computer 22 generates an "admission ticket" containing the players selections as well as other information needed to allow player entry into the tournament, including a Session ID associated with the piayer's selections. The network computer 22 then forwards the admission ticket to player via the gaming unit 20 at block 262. At block 224, the ticket printer 56 may then print the tournament admission voucher including the player's name, the Session ID, and reflecting the player's selections.

Returning to block 259, if the player does not select the fixed gaming machine. mode, indicating that he does not wish to reserve a gaming unit during tournament play, it may be assumed that the player has selected a "float machine mode" by default. Upon a determination of the float machine mode option, at block 263, the gaming unit forwards the player's selections (e.g. group player, anonymous mode, float machine mode, tournament type, tournament time, etc.) to the network computer 22. In response, at block 264, the network computer 22 generates an "admission ticket" containing the players selections as well as other information needed to allow player entry into the tournament including a Session ID associated with the player's selections. The network computer 22 then forwards the admission ticket to player via the gaming unit 20 at block 265. At block 224, the ticket printer 56 may then print tournament admission voucher, At block 224, the ticket printer 56 may then print the tournament admission voucher including the player's name, the Session ID, and reflecting the player's selections.

Figure 5E:
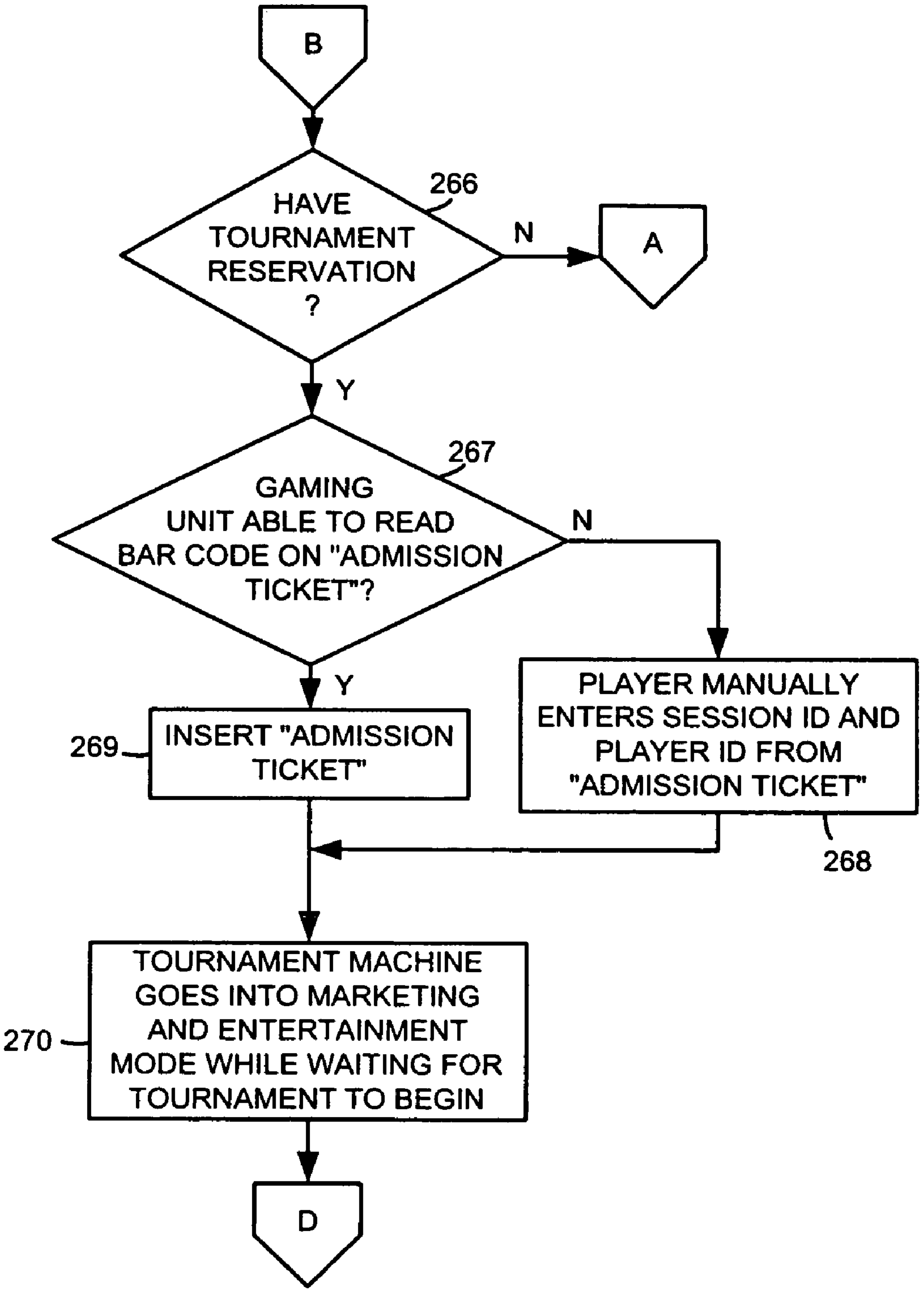
Figure 5F:
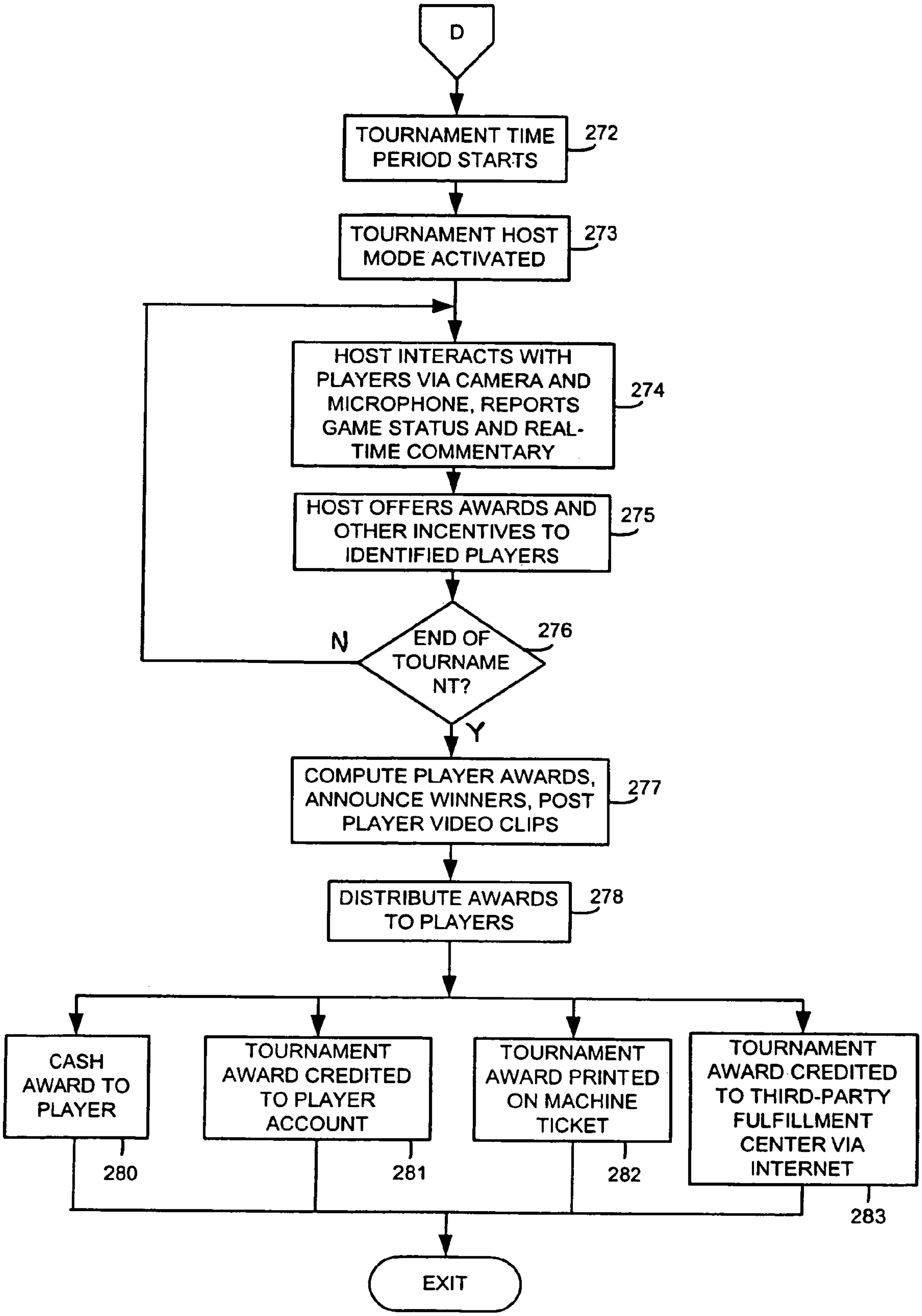

Referring to FIG. 5E, a tournament player may be required to have a tournament ticket voucher indicating that the player has made a tournament reservation, at block 266. If the player is required to have a tournament reservation, and does not, he may enroll in the tournament as described in connection with FIGS. 5B-5D. If the player does have a tournament reservation, he may confirm his reservation at the gaming unit he intends to use during the gaming tournament. If the player has a tournament ticket voucher indicating a fixed mode selection, he may confirm his tournament reservation at the gaming unit indicated on the tournament ticket voucher. If, however, the player has a tournament ticket voucher indicating a float mode selection, he may confirm his tournament reservation at any appropriate gaming unit.

Once at the gaming unit to be used during the tournament, the player may confirm his reservation in a number of ways, depending on the configuration of the gaming machine. If the gaming unit is able to read the bar code imprinted on the tournament ticket voucher, the player may simply confirm his reservation via inserting the tournament ticket voucher into the appropriate slot on the gaming unit, at block 269. If the gaming unit 20 is an older model that is not configured to the read bar code printed on the tournament ticket voucher, the player may be required to confirm his reservation at block 268 by manually entering the (i) session ID and (ii) player ID printed on the tournament ticket voucher. Upon completion of tournament reservation verification at either block 269 or block 268, the gaming unit 20 goes into a marketing and/or entertaining mode while awaiting the tournament start time, at block 270.

As the start time for the tournament draws near, the player is notified, for example, in a count-down fashion, to prepare to begin tournament play. The player is given instructions via text appearing on a visual display of the selected gaming unit, or via demonstration games presented to the player during enrollment. The tournament players are given an indication when the preselected tournament start time begins, at block 272. The tournament host mode is then activated at block 273. Once activated, the tournament host mode allows audio and/or visual communication from the tournament player at the gaming unit 20, to the host computer 46 and the gaming host 47 at block 273. Likewise, at block 274, the tournament host mode allows audio and/or visual communication from the gaming host 47 at the host computer 46, to the tournament player at gaming unit 20. If a player has chosen to remain anonymous during the gaming tournament, however, he may abstain from sending audio and/or visual communication with the tournament host 47. In this way, the gaming system 10 utilizes the bidirectional audio and/or visual and/or data communication between the tournament host 47 and the tournament players to provide tournament players with an interactive and therefore, an enhanced gaming experience as described above.

In addition, due to the two-way audio and/or visual and/or data nature of the communication between the tournament host 47 and the tournament players, at block 274, the tournament host 47 is able to offer awards and incentives throughout the gaming tournament rather than wait until the end of the tournament to award the final prizes, at block 275. This ability to offer "event-driven" prizes, synchronized to specific events, further enhances the gaming experience. For example, the tournament host may offer to give 500 credit points to the next the tournament player who hits all cherries during a slot tournament. In another example, the tournament host 47 may award an extra five minutes of play time to the players at a particular casino site if any team member hits a jackpot.

When the gaming tournament is over at decision block 276, the awards are computed, the winners may be announced, and video feed of the winners may be broadcast to the tournament players at block 277. The awards are then distributed to the winners at block 278 using a variety of award means. The award means may include dispensing cash to the player at block 280, or may include adding credits to the player tracking cards associated with tournament player winners who registered for the gaming tournament via their player tracking cards, at block 281. The award means may also include dispensing a machine ticket printed from a gaming machine printer and indicating the nature or amount of the award at block 282. In addition, at block 283, the tournament award may be credited to a third party fullfillment center where the winner can redeem points for a variety of merchandise awards from merchants, for example, Amazon.com, Macy.com, etc.

Figure 7:
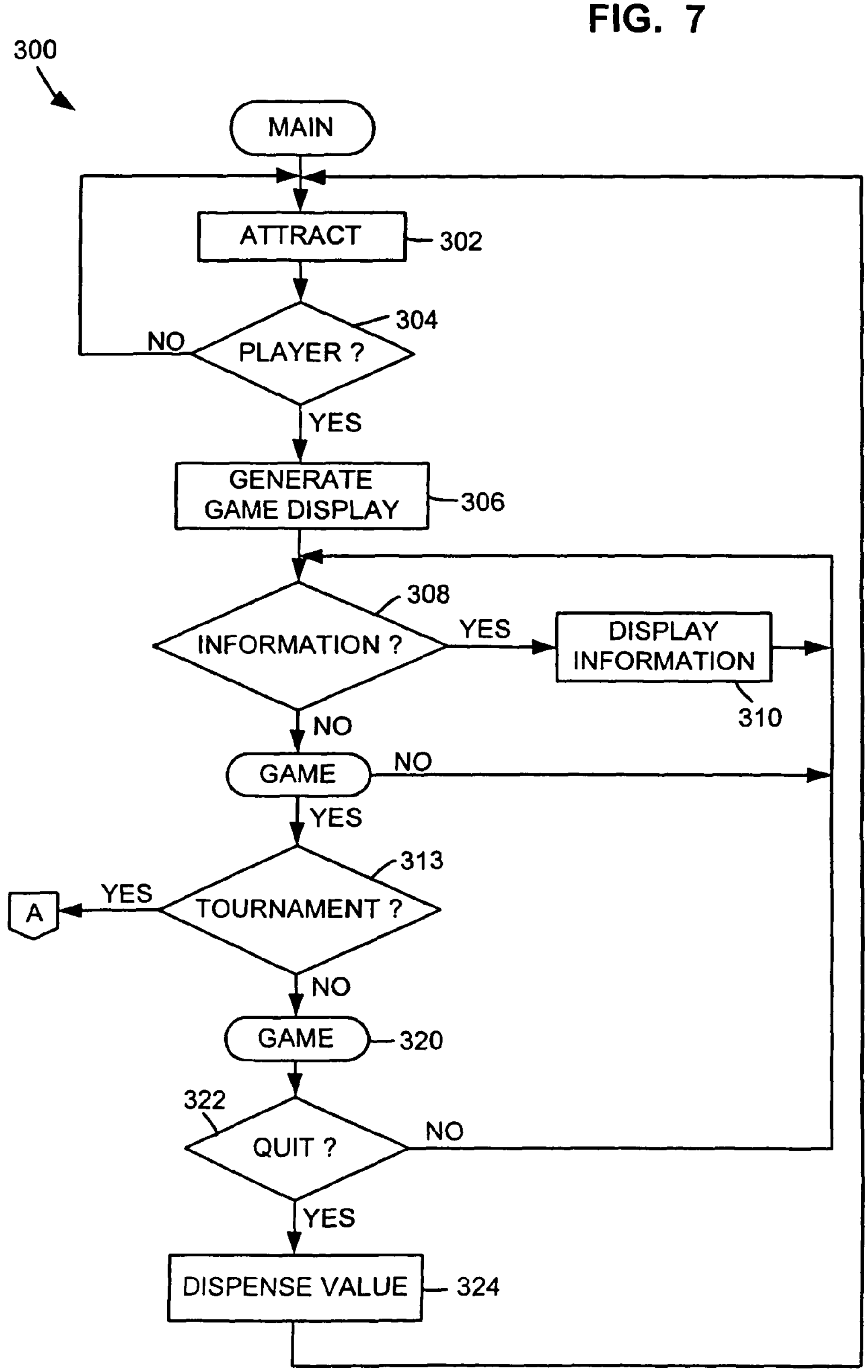
FIG. 7 is a flowchart of an alternative embodiment of a main routine that may be performed during operation of one or more of the gaming units.

FIG. 7 is a flowchart of an alternative main operating routine 300 that may be stored in the memory of the controller 100. The main routine 300 may be utilized for gaming units 20 that are designed to allow play of a single game or a tournament game. Referring to FIG. 7, the main routine 300 may begin operation at block 302 during which an attraction sequence may be performed in an attempt to induce a potential player in a casino to play the gaming unit 20. The attraction sequence may be performed by displaying one or more video images on the color video display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the color video display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. At block 312, it is determined whether the player requested initiation of a game, in which case, the controller 100 may cause an additional game selection option at block 313. At block 313, it is determined whether the player wishes to play the game individually or wishes to participate in a gaming tournament, thereby competing with other tournament players located at other gaming machines.

If the individual player selects the option to play the game individually, the controller 100 may cause one of a number of game routines 320 may be performed. The game routine 320 could be any one of the game routines disclosed herein, such as one of the five game routines 207, 208, 209, 210, 211, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

If the player selects to participate in a gaming tournament at block 313, the routine 300 branches to block 214 shown on FIG. 5B where it is determined if the player prefers to participate as a single player entry or a group player entry. The player selecting tournament play may then enroll, make player selections, verify tournament reservations, and play in the tournament as described in connection with FIGS. 5B-5F.

Video Poker

Figure 8:
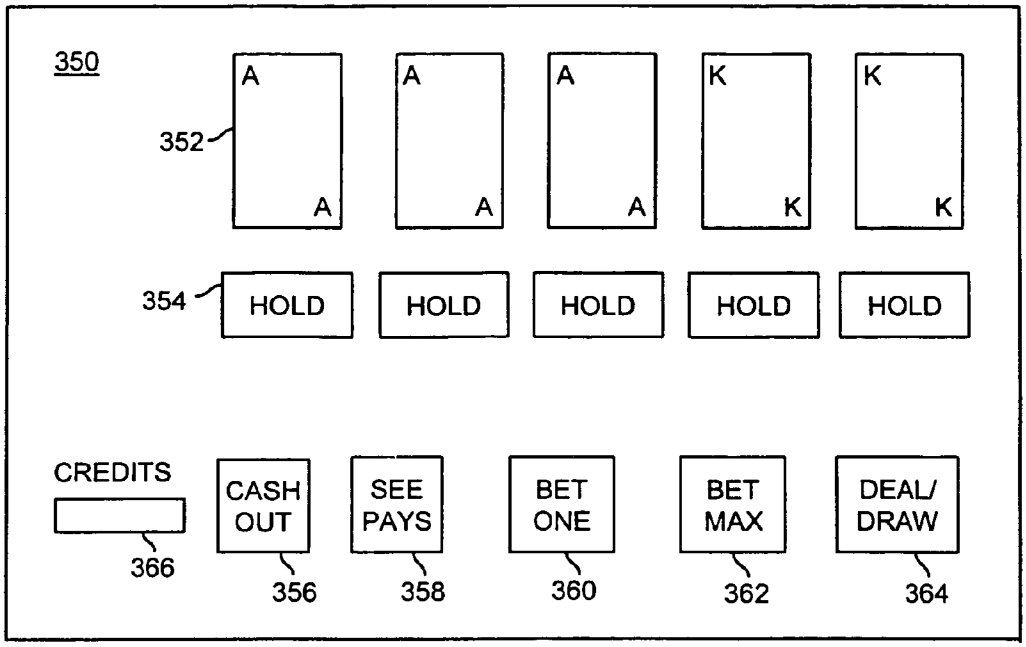
FIG. 8 is an illustration of an embodiment of a visual display that may be displayed during performance of the video poker routine of FIG. 10.

FIG. 8 is an exemplary display 350 that may be shown on the color video display unit 70 during performance of the video poker routine 207 shown schematically in FIG. 5A. Referring to FIG. 8, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the color video display unit 70 is provided with a touch-sensitive screen, the buttons 354, 356, 358, 360, 362, 364 may form part of the video display 350. Alternatively, one or more of those buttons may be provided as part of a control panel that is provided separately from the color video display unit 70.

Figure 10:
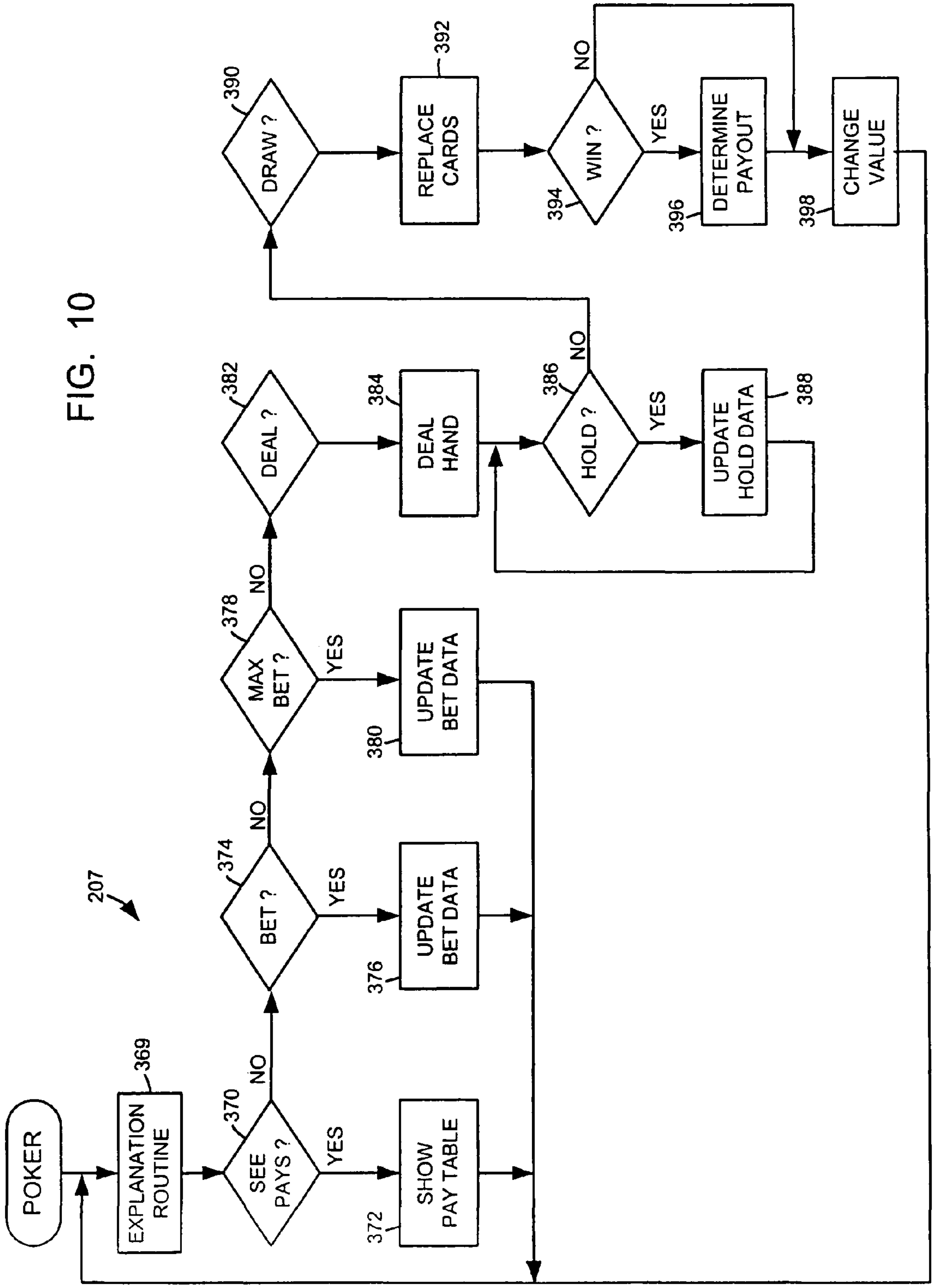
FIG. 10 is a flowchart of an embodiment of a video poker routine that may be performed by one or more of the gaming units.

FIG. 10 is a flowchart of the video poker routine 207 shown schematically in FIG. 5A. Referring to FIG. 10, at block 370, the routine may determine whether the player has requested payout information, such as by activating the "See Pays" button 358, in which case at block 372 the routine may cause one or more pay tables to be displayed on the color video display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the color video display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 8).

Although the video poker routine 207 is described above in connection with a single poker hand of five cards, the routine 207 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 9:
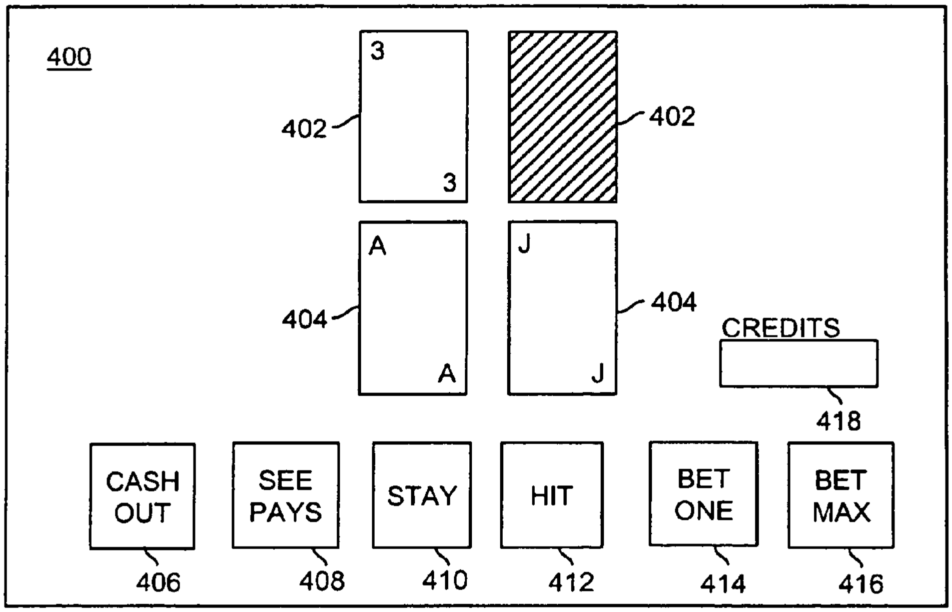
FIG. 9 is an illustration of an embodiment of a visual display that may be displayed during performance of the video blackjack routine of FIG. 11.

FIG. 9 is an exemplary display 400 that may be shown on the color video display unit 70 during performance of the video blackjack routine 208 shown schematically in FIG. 5A. Referring to FIG. 9, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the color video display unit 70 is provided with a touch-sensitive screen, the buttons 406, 408, 410, 412, 414, 416 may form part of the video display 400. Alternatively, one or more of those buttons may be provided as part of a control panel that is provided separately from the color video dispiay unit 70.

Figure 11:
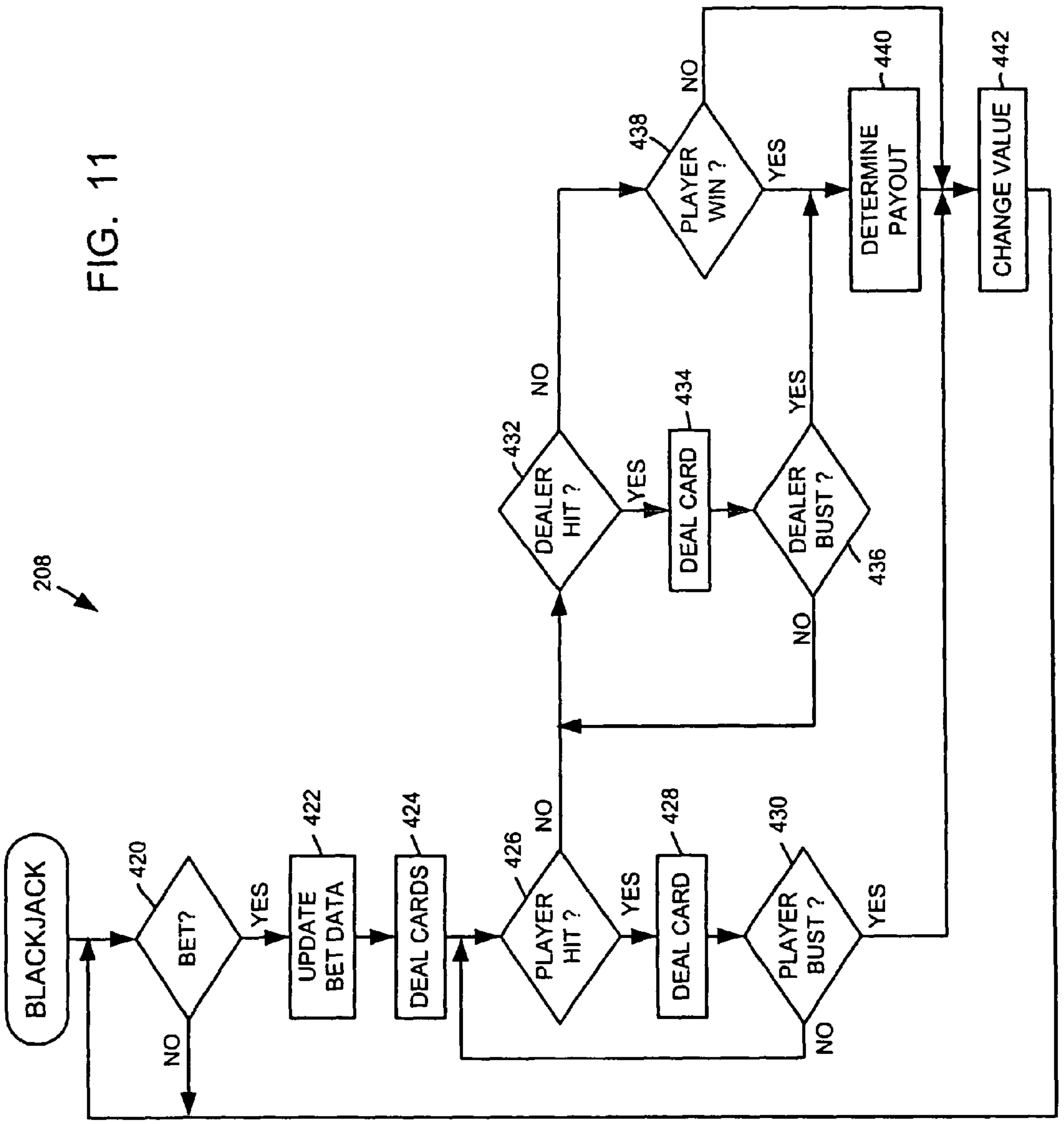
FIG. 11 is a flowchart of an embodiment of a video blackjack routine that may be performed by one or more of the gaming units.

FIG. 11 is a flowchart of the video blackjack routine 208 shown schematically in FIG. 5A. Referring to FIG. 11, the video blackjack routine 208 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the color video display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 9).

Slots

FIG. 12 is an exemplary display 450 that may be shown on the color video display unit 70 during performance of the slots routine 209 shown schematically in FIG. 5A. Referring to FIG. 12, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 14:
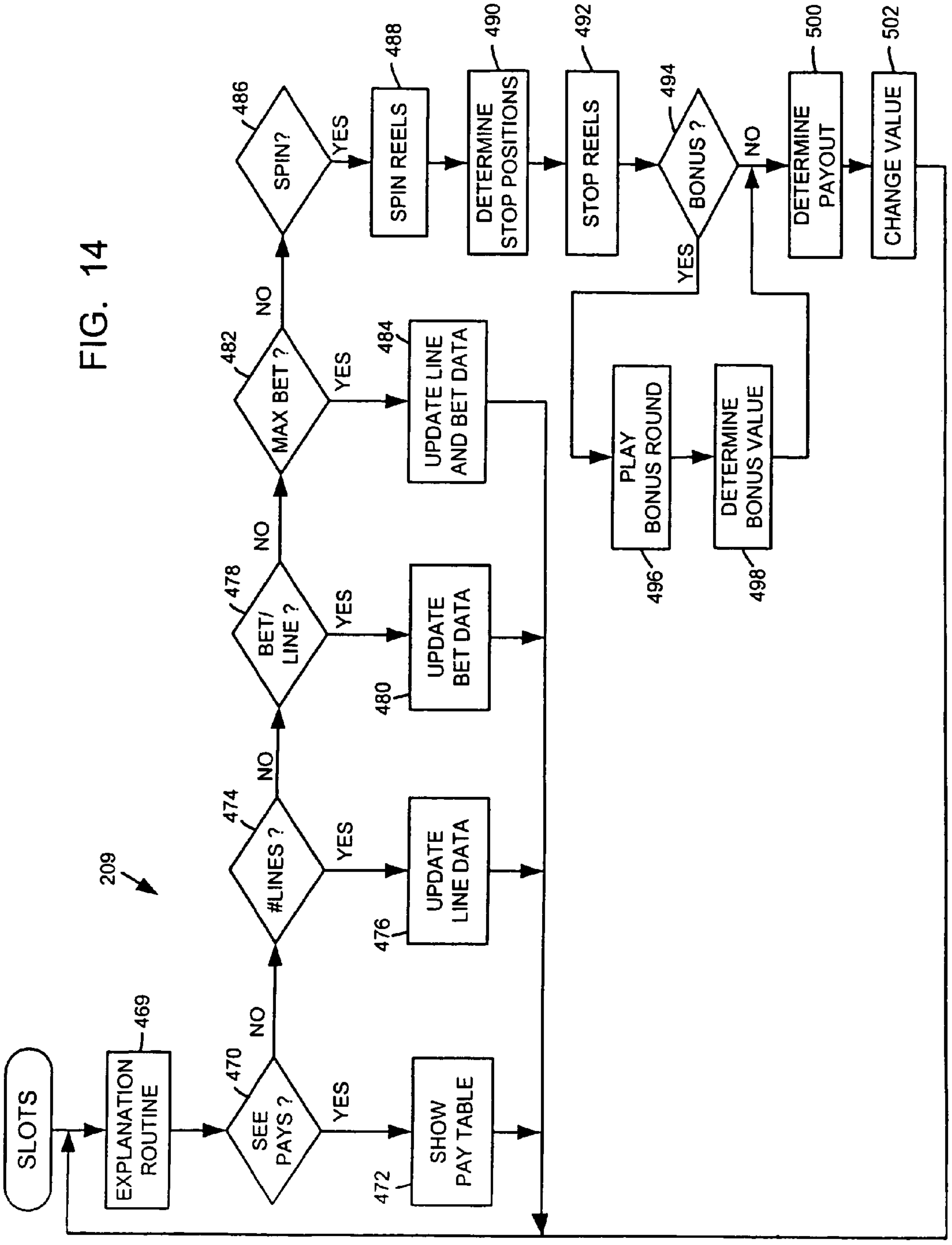
FIG. 14 is a flowchart of an embodiment of a slots routine that may be performed by one or more of the gaming units.

FIG. 14 is a flowchart of the slots routine 209 shown schematically in FIG. 12. Referring to FIG. 14, at block 470, the routine may determine whether the player has requested payout information, such as by activating the "See Pays" button 458, in which case at block 472 the routine may cause one or more pay tables to be displayed on the color video display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the color video display unit 70, actual slot machine reels that are capable of being spun may be utilized instead.

Video Keno

FIG. 13 is an exemplary display 520 that may be shown on the color video display unit 70 during performance of the video keno routine 210 shown schematically in FIG. 5A. Referring to FIG. 13, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the color video display unit 70 is provided with a touch-sensitive screen, the buttons may form part of the video display 520. Alternatively, one or more of those buttons may be provided as part of a control panel that is provided separately from the color video display unit 70.

Figure 15:
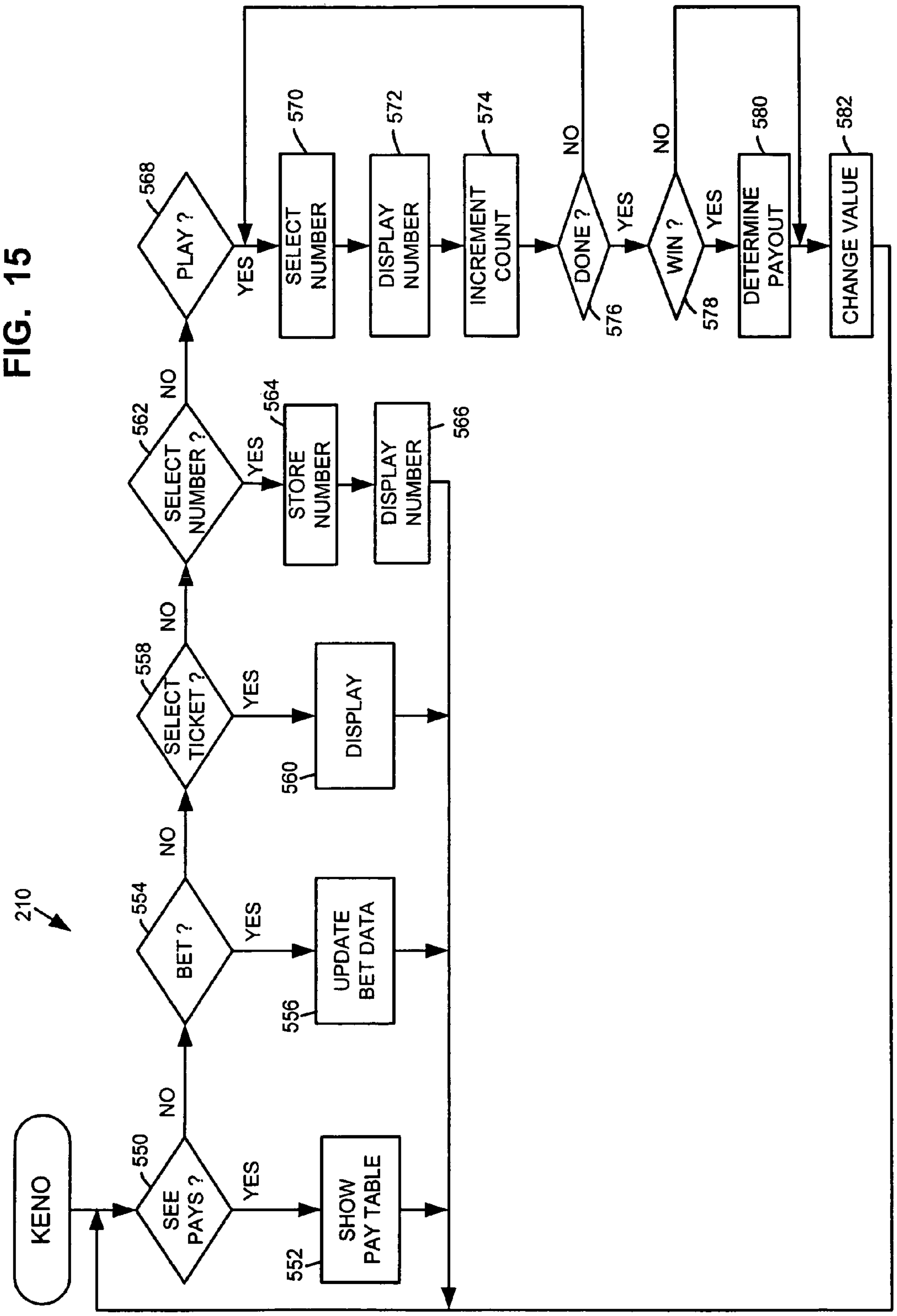
FIG. 15 is a flowchart of an embodiment of a video keno routine that may be performed by one or more of the gaming units.

FIG. 15 is a flowchart of the video keno routine 210 shown schematically in FIG. 5A. The keno routine 210 may be utilized in connection with a single gaming unit 20 where a single player is playing a keno game, or the keno routine 210 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 15, at block 550, the routine may determine whether the player has requested payout information, such as by activating the "See Pays" button 528, in which case at block 552 the routine may cause one or more pay tables to be displayed on the color video display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the color video display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 13).

Video Bingo

Figure 16:
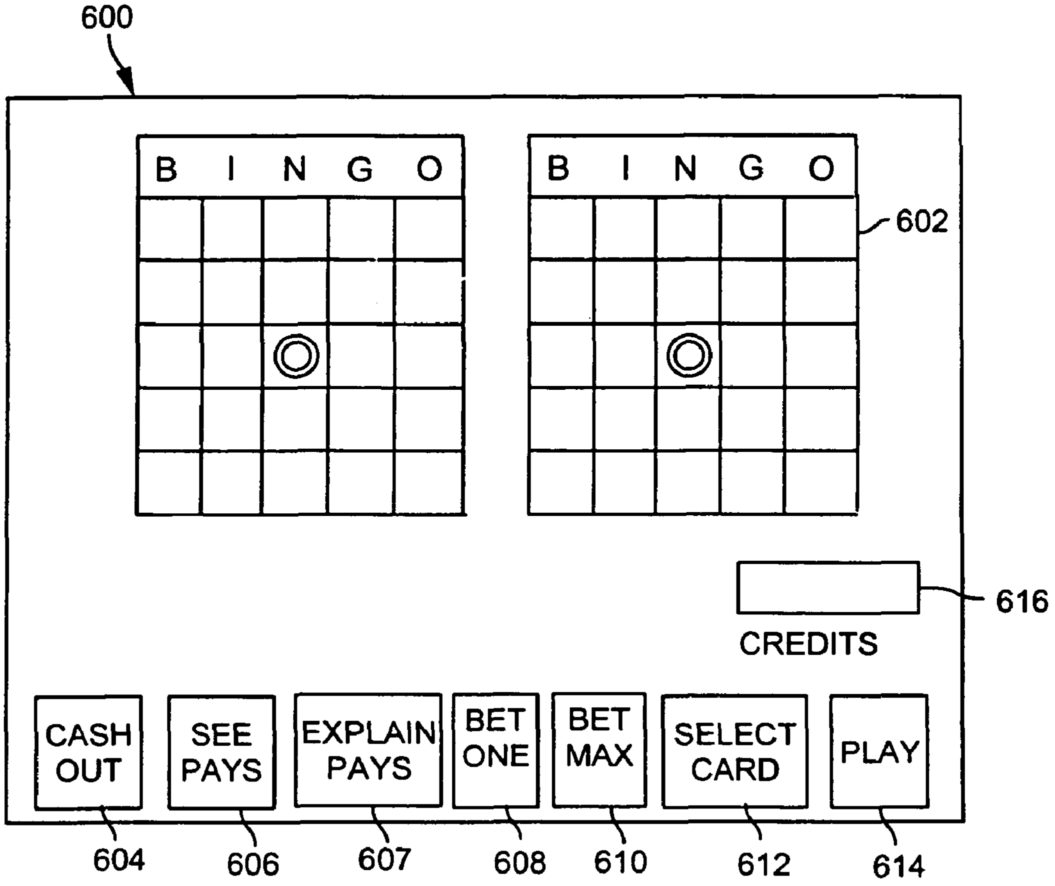
FIG. 16 is an illustration of an embodiment of a visual display that may be displayed during performance of the video bingo routine of FIG. 17.

FIG. 16 is an exemplary display 600 that may be shown on the color video display unit 70 during performance of the video bingo routine 211 shown schematically in FIG. 5A. Referring to FIG. 16, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the color video display unit 70 is provided with a touch-sensitive screen, the buttons may form part of the video display 600. Alternatively, one or more of those buttons may be provided as part of a control panel that is provided separately from the color video display unit 70.

Figure 17:
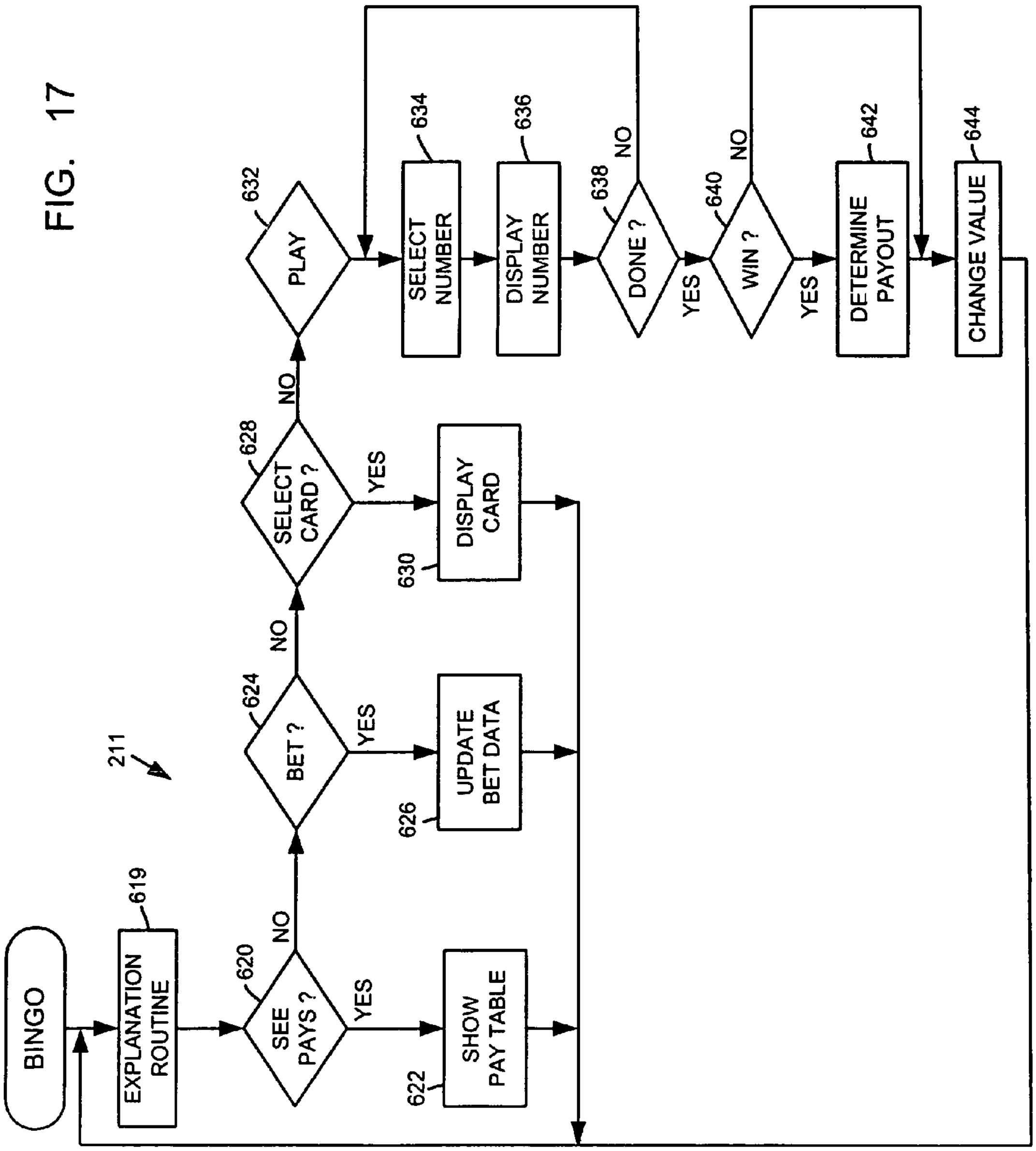
FIG. 17 is a flowchart of an embodiment of a video bingo routine that may be performed by one or more of the gaming units.

FIG. 17 is a flowchart of the video bingo routine 211 shown schematically in FIG. 5A. The bingo routine 211 may be utilized in connection with a single gaming unit 20 where a single player is playing a bingo game, or the bingo routine 211 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 17, at block 620, the routine may determine whether the player has requested payout information, such as by activating the "See Pays" button 606, in which case at block 622 the routine may cause one or more pay tables to be displayed on the color video display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the color video display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 16).

What is claimed is:

1. A computing system for conducting a gaming tournament among a first tournament player, a second tournament player, and a live person acting as a tournament host during said gaming tournament, wherein said computing system is configured to:

generate host data, said host data configured to be generated from audio or visual input from said live person acting as said tournament host, said host data being generated during said gaming tournament;

cause said host data to be transmitted to a first gaming unit including a gaming unit controller and together configured for communication with a host computer, said first gaming unit configured to be played by said first tournament player during said gaming tournament, said first gaming unit comprising a first display unit capable of generating video images representing a first instance of a tournament game of the gaming tournament, said host data generating a host display image on said first display unit; and cause said host data to be transmitted to a second gaming unit including a second gaming unit controller and together configured for communication with said host computer, said second gaming unit configured to be played by said second tournament player during said gaming tournament, said second gaming unit comprising a second display unit capable of generating video images representing a second instance of a tournament game of said gaming tournament, said host data generating said host display image on said second display unit, said first gaming unit controller being programmed to determine outcomes of said first and second instances of tournament games, respectively, without reference to said host data received from said host computer.

2. A computing system as recited in claim 1, wherein said host data provides an audio output and a video output to said first tournament player during said gaming tournament, said audio and video output being generated based on said host data.

3. The computing system of claim 1, the computing system further operable to:

generate first player data from audio or visual input from said first tournament player, said first player data being generated during said gaming tournament; and cause first player data to be output from a sound- or image-generating device associated with said host computer.

4. The computing system of claim 1, the computing system further operable to cause a value payout associated with said first gaming unit in response to said outcome of said first instance of a tournament game.

5. The computing system of claim 1, the computing system further operable to accept a touch input of said first tournament player via said first display unit.

6. The computing system of claim 1, said computing system further operable to obtain an identity of said first tournament player.

7. A computer readable medium including computer program code for conducting a gaming tournament among a first tournament player, a second tournament player, and a live person acting as a tournament host during said gaming tournament, said computer readable medium comprising:

computer program code configured to generate host data from audio or visual input from said live person acting as said tournament host, said host data being generated during said gaming tournament;

computer program code for causing said host data to be transmitted to a first gaming unit including a gaming unit controller and together configured for communication with a host computer, said first gaming unit configured to be played by said first tournament player during said gaming tournament, said first gaming unit comprising a first display unit capable of generating video images representing a first instance of a tournament game of said gaming tournament, said host data generating a host display image on said first display unit; and computer program code for causing said host data to be transmitted to a second gaming unit including a second gaming unit controller and together configured for communication with said host computer, said second gaming unit configured to be played by said second tournament player during said gaming tournament, said second gaming unit comprising a second display unit capable of generating video images representing a second instance of a tournament game of said gaming tournament, said host data generating said host display image on said second display unit, said first and second gaming unit controllers being programmed to determine outcomes of said first and second instances of tournament games, respectively, without reference to said host data received from said host computer.

8. The computer readable medium of claim 7, further comprising:

computer code for generating first player data from audio or visual input from said first tournament player, said first player data being generated during said gaming tournament; and computer code for causing said first player data to be output from a sound or image generating device associated with said host computer.

9. The computer readable medium of claim 7, further comprising computer code for causing a value payout associated with said first gaming unit in response to said outcome of said first instance of a tournament game.

10. The computer readable medium of claim 7, further comprising computer code for accepting a touch input of said first tournament player via said first display unit.

11. The computer readable medium of claim 7, further comprising computer code for obtaining an identity of said first tournament player.

12. A computing system for conducting a gaming tournament among a first tournament player, a second tournament player, and a live person acting as a tournament host during the gaming tournament, the gaming system comprising:

a host computer configured for transmitting host data from audio or visual input from the live person acting as the tournament host, the host data being generated during the gaming tournament;

a first gaming machine configured for communicating with the host computer, the first gaming machine including a first gaming controller and a first display unit, the first gaming machine configured for being played by the first tournament player during the gaming tournament and for receiving the host data, the first display unit capable of generating video images representing a first instance of a tournament game of the gaming tournament and generating a host display image utilizing the host data, the first gaming controller configured to determine an outcome of the first instance of a tournament game of the gaming tournament without reference to the host data; and a second gaming machine configured for communicating with the host computer, the second gaming machine including a second gaming controller and a second display unit, the second gaming machine configured for being played by the second tournament player during the gaming tournament and for receiving the host data, the second display unit capable of generating video images representing a second instance of a tournament game of the gaming tournament and generating the host display image on the second display unit utilizing the host data, the second gaming controller configured to determine an outcome of the second instance of a tournament game of the gaming tournament without reference to the host data.

13. A computing system for a gaming tournament, the computing system comprising:

host computer means for generating and transmitting, during a gaming tournament, host data from audio or visual input from a live person acting as a tournament host;

first gaming machine means for receiving the host data at a first gaming machine, displaying a first instance of a tournament game of the gaming tournament to a first player on a first display of the first gaming machine, displaying a host display image on the first display utilizing the host data, and determining an outcome of the first instance of a tournament game without reference to the host data; and second gaming machine means for receiving the host data at a second gaming machine, displaying a second instance of a tournament game of the gaming tournament to a second player on a second display of the second gaming machine, displaying the host display image on the second display utilizing the host data, and determining an outcome of the first instance of a tournament game without reference to the host data.

14. The computing system of claim 13, the computing system further comprising:

means for generating first player data from audio or visual input from the first tournament player by the first gaming machine;

means for generating second player data from audio or visual input from the second tournament player by the second gaming machine; and means for outputting the first and second player data by the host computer.

15. The computing system of claim 13, the computing system further comprising means for causing a value payout associated with the first gaming unit in response the outcome of the first instance of a tournament game.

16. The computing system of claim 13, the computing system further comprising means for accepting input of the first tournament player via the first display unit.

17. The computing system of claim 13, the computing system further comprising means for identifying the first tournament player.

18. A method of conducting a gaming tournament among a first player, a second player, and a live person acting as a tournament host during the gaming tournament, the method comprising machine-implemented steps for:

generating host data, said host data configured to be generated from audio or visual input from the live person acting as the tournament host, the host data being generated during the gaming tournament;

causing the host data to be transmitted to a first gaming unit including a first gaming unit controller and together configured for communication with the host computer, the first gaming unit configured to be played by the first player during the gaming tournament, the first gaming unit comprising a first display unit capable of generating video images representing a first instance of a tournament game of the gaming tournament, the host data generating a host display image on the first display unit;

causing the host data to be transmitted to a second gaming unit including a second gaming unit controller and together configured for communication with the host computer, the second gaming unit configured to be played by the second player during the gaming tournament, the second gaming unit comprising a second display unit capable of generating video images representing a second instance of a tournament game of the gaming tournament, the host data generating the host display image on the second display unit; and determining, by the first and second gaming unit controllers, outcomes of the first and second instances of tournament games, respectively, without reference to the host data received from the host computer.

19. The method of claim 18, the method further comprising:

generating first player data from audio or visual input from the first tournament player by the first gaming machine; and outputting first player data from the host computer.

20. The method of claim 18, the method further comprising identifying the first tournament player.

* * * * *